United States Patent
Shimomugi et al.

(10) Patent No.: US 8,817,506 B2
(45) Date of Patent: Aug. 26, 2014

(54) CONVERTER CIRCUIT, AND MOTOR DRIVE CONTROL APPARATUS, AIR-CONDITIONER, REFRIGERATOR, AND INDUCTION HEATING COOKER PROVIDED WITH THE CIRCUIT

(75) Inventors: Takuya Shimomugi, Tokyo (JP);
Yosuke Shinomoto, Tokyo (JP);
Kazunori Sakanobe, Tokyo (JP);
Michio Yamada, Tokyo (JP); Kazunori Hatakeyama, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 638 days.

(21) Appl. No.: 13/058,401

(22) PCT Filed: Mar. 17, 2009

(86) PCT No.: PCT/JP2009/055109
§ 371 (c)(1),
(2), (4) Date: Feb. 10, 2011

(87) PCT Pub. No.: WO2010/023978
PCT Pub. Date: Mar. 4, 2010

(65) Prior Publication Data
US 2011/0132899 A1   Jun. 9, 2011

(30) Foreign Application Priority Data
Sep. 1, 2008   (JP) .................................. 2008-223646

(51) Int. Cl.
*H02M 5/42* (2006.01)
*H02M 7/04* (2006.01)
*H02M 7/68* (2006.01)

(52) U.S. Cl.
USPC .......................................... 363/89; 323/272

(58) Field of Classification Search
USPC ............................................. 323/272; 363/89
See application file for complete search history.

(56) References Cited

U.S. PATENT DOCUMENTS

| 7,317,305 B1 | 1/2008 | Stratakos et al. |
| 2004/0041543 A1 | 3/2004 | Brooks et al. |

(Continued)

FOREIGN PATENT DOCUMENTS

| CN | 101164023 A | 4/2008 |
| CN | 101252311 A | 8/2008 |

(Continued)

OTHER PUBLICATIONS

Japanese Office Action (Notice of Reasons For Rejection) dated Oct. 16, 2012, issued in corresponding Japanese Patent Application No. 2010-526585, and English language translation of Office Action. (7 pages).

(Continued)

*Primary Examiner* — Jue Zhang
(74) *Attorney, Agent, or Firm* — Buchanan Ingersoll & Rooney PC

(57) ABSTRACT

A converter circuit including a step-up converter including a rectifier, a step-up reactor, a switching element, and a reverse current prevention element; a step-up converter having a step-up reactor, a switching element, and a reverse current prevention element and connected in parallel with the step-up converter; a switching control unit that controls switching elements; and a smoothing capacitor that is provided at the output of the step-up converters. The switching control unit switches the current mode of the current flowing through the step-up reactors into any of a continuous mode, a critical mode, and a discontinuous mode based on a predetermined condition.

12 Claims, 14 Drawing Sheets

(56) References Cited

U.S. PATENT DOCUMENTS

| | | | |
|---|---|---|---|
| 2005/0036337 A1* | 2/2005 | Zhang et al. | 363/17 |
| 2007/0080671 A1 | 4/2007 | Qahouq et al. | |
| 2008/0042709 A1 | 2/2008 | Chen et al. | |

FOREIGN PATENT DOCUMENTS

| | | |
|---|---|---|
| JP | A-6-197558 | 7/1994 |
| JP | 06-233597 A | 8/1994 |
| JP | 2000-295854 A | 10/2000 |
| JP | A-2000-358363 | 12/2000 |
| JP | 2003-339159 A | 11/2003 |
| JP | 2004-282958 A | 10/2004 |
| JP | A-2004-357388 | 12/2004 |
| JP | 2005-128902 A | 5/2005 |
| JP | 2006-230057 A | 8/2006 |
| JP | 2007-195282 A | 8/2007 |
| JP | 2007-234278 A | 9/2007 |
| JP | 2008-086107 A | 4/2008 |
| JP | 2008-086108 A | 4/2008 |
| WO | 2006/074372 A2 | 7/2006 |

OTHER PUBLICATIONS

Extended European Search Report dated Jun. 13, 2013, issued by the European Patent Office in the corresponding European Application No. 09809633.2. (11 pages).
International Search Report (PCT/ISA/210) for PCT/JP2009/055109 dated Jun. 16, 2009.
Australian Office Action dated Dec. 17, 2012.
Office Action (Patent Examination Report No. 2) dated Jul. 17, 2013, issued by the Australian Patent Office in the corresponding Australian Patent Application No. 2009285313. (4 pages).
Office Action (Notification of the First Office Action) dated Mar. 11, 2013, issued in corresponding Chinese Patent Application No. 200980133751.8, and an English Translation of the Office Action. (13 pages).
Office Action (Notice of Reasons for Rejection) dated Apr. 23, 2013, issued in corresponding Japanese Patent Application No. 2010-526585, and an English Translation of the Office Action. (7 pages).
Jan. 7, 2014 Japanese Office Action issued in Japanese Patent Application No. 2012-273668.
Office Action (Notification of the Second Office Action) issued Oct. 18, 2013, by the Chinese Patent Office in corresponding Chinese Patent Application No. 200980133751.8. (5 pages).
Mar. 27, 2014 Chinese Office Action issued in Chinese Patent Application No. 200980133751.8.
May 14, 2014 European Search Report issued in European Patent Application No. EP14162181.3.
May 14, 2014 European Search Report issued in European Patent Application No. EP14162180.5.
May 20, 2014 European Search Report issued in European Patent Application No. EP14162176.3.
Chi-Ying Tsui et al., "A pseudo-CCm/DCM SIMO switching converter with freewheel switching", IEEE Journal of Sold-State Circuits, IEEE Service Center, Piscataway, NJ, USA, vol. 38, No. 6, Jun. 1, 2003, pp. 1007-1014, XP011097044.

* cited by examiner

F I G. 1
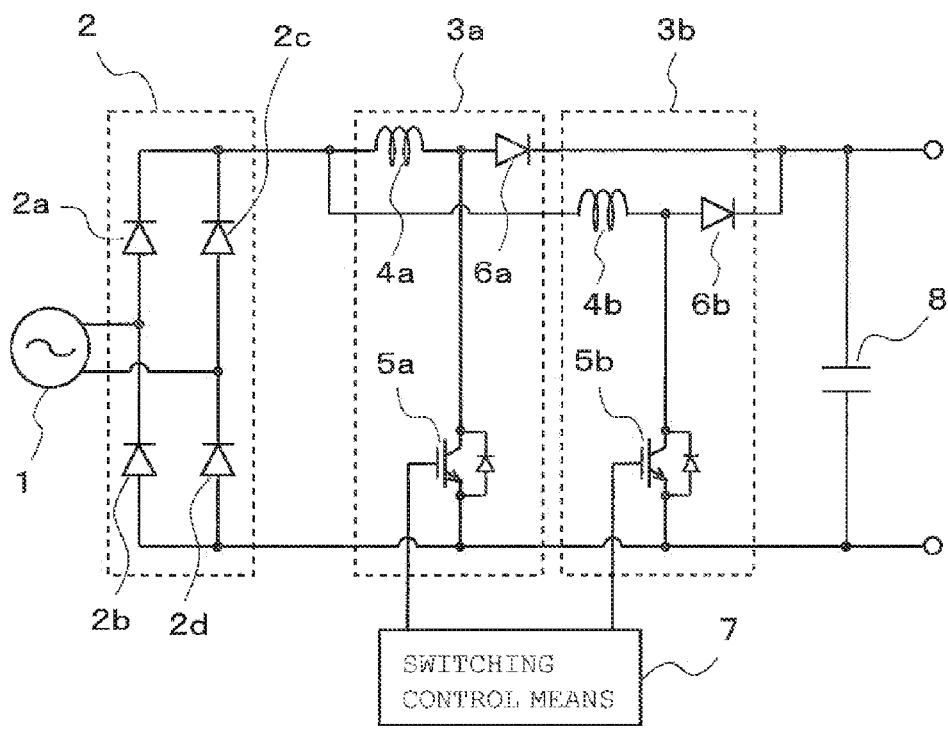

F I G. 9
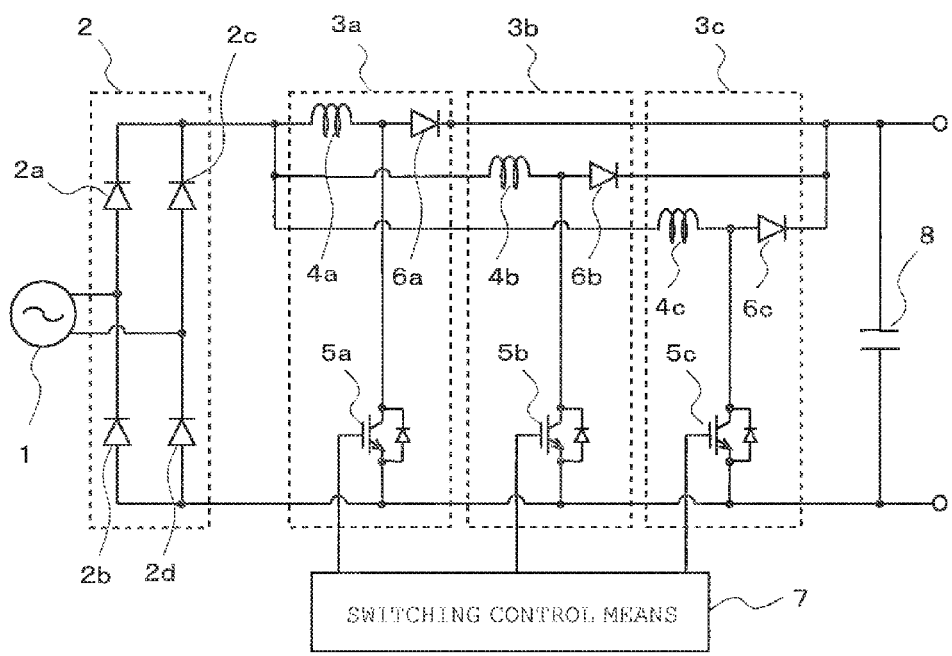

FIG. 16
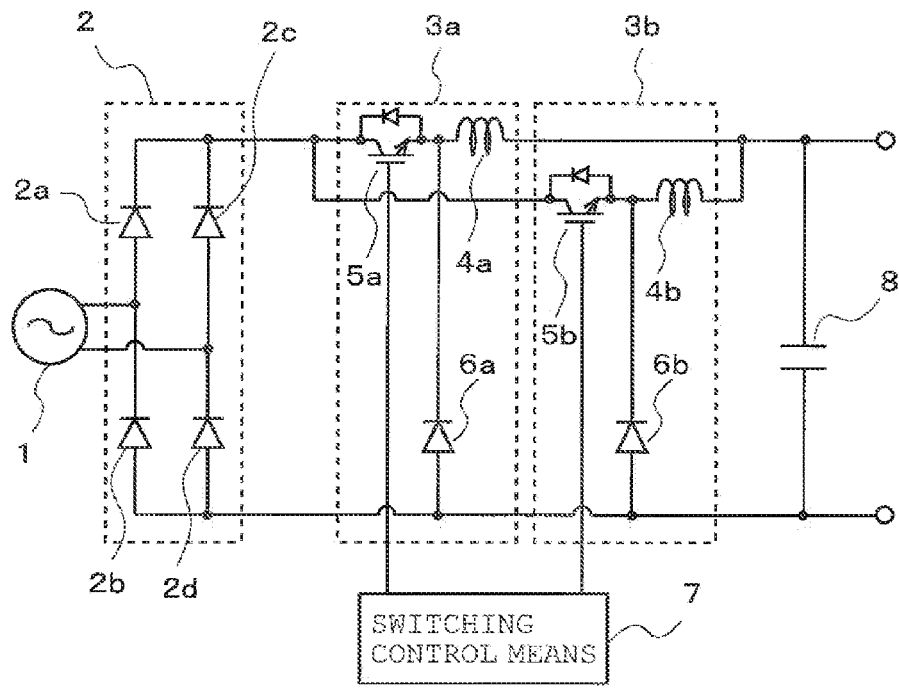
(a) STEP-UP CONVERTER
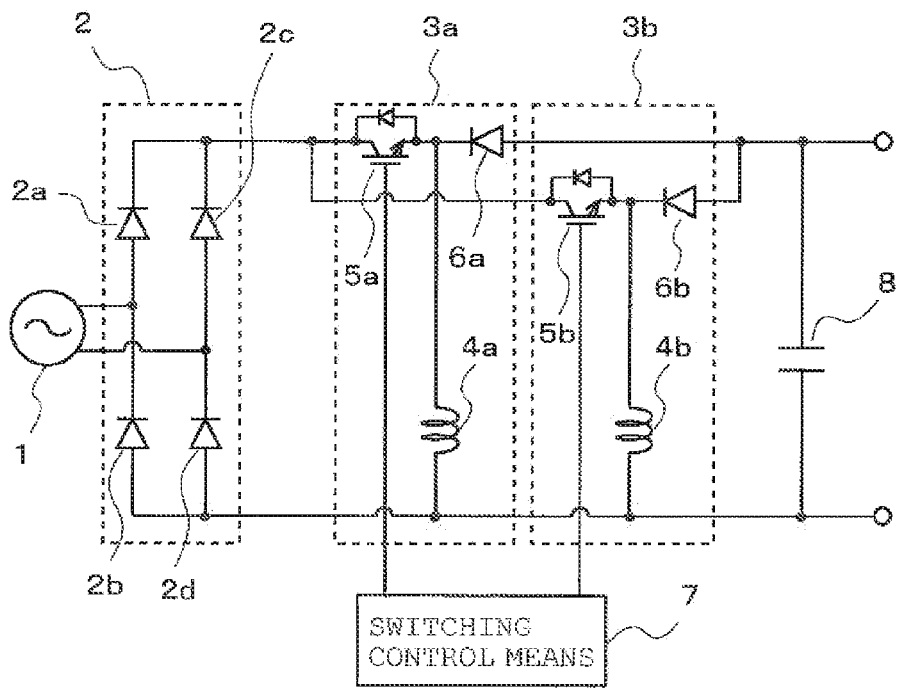
(b) STEP-UP/STEP-DOWN CONVERTER

CONVERTER CIRCUIT, AND MOTOR DRIVE CONTROL APPARATUS, AIR-CONDITIONER, REFRIGERATOR, AND INDUCTION HEATING COOKER PROVIDED WITH THE CIRCUIT

TECHNICAL FIELD

The present invention relates to a converter circuit and a motor drive control apparatus, an air-conditioner, a refrigerator, and an induction heating cooker provided with the circuit.

BACKGROUND ART

Conventionally, a step-down converter and a step-up/step-down converter as well as a step-up converter are usually used as a power factor correction (PFC) circuit.

In order to achieve a small and light-weighted converter circuit, a converter circuit is proposed including "a rectification circuit whose input is an AC power source, a first step-up converter circuit connected to the output of the rectification circuit and having at least a first reactor, first switching means and a first diode, a second step-up converter circuit connected to the first step-up converter circuit in parallel and having at least a second reactor, second switching means and a second diode, and a smoothing capacitor connected to outputs of the first step-up converter circuit and the second step-up converter circuit." (For example, refer to Patent Literature 1)

Patent Literature 1; Japanese Patent No. 2008-86107 (claim 1)

SUMMARY OF INVENTION

Technical Problem

When employing a step-up converter, or a step-down converter and a step-up/step-down converter as a power factor correction circuit, it is necessary to operate a current flowing through a reactor as a continuous mode. Therefore, the reactor having a large inductance is needed and a small and light-weighted circuit cannot be achieved disadvantageously.

With a configuration in which a plurality of systems of a converter circuit is connected in parallel, switching loss becomes large disadvantageously.

The present invention is made to solve the above-mentioned problems and its object is to provide a small light-weighted converter circuit capable of reducing switching loss and a motor drive control apparatus, an air-conditioner, a refrigerator, and an induction heating cooker having the circuit.

Solution to Problem

The converter circuit according to the present invention includes a rectifier to rectify AC voltages, a first converter section that is connected with the output of the rectifier and has a first reactor, a first switching element, and a first reverse current prevention element, a second converter section that is connected with the output of the rectifier, that has a second reactor, a second switching element, and a second reverse current prevention element, and that is connected in parallel to the first converter section, switching control means that controls the first and the second switching elements, and a smoothing capacitor provided at the output of the first and the second converter sections. The switching control means switches the current mode of the current flowing through the first and the second reactors into any of a continuous mode, a critical mode, and a discontinuous mode based on a predetermined condition.

Advantageous Effects of Invention

Since the present invention includes a first converter section and a second converter section connected with the first converter section in parallel, an inductance required for a reactor can be made small, allowing to achieve a small light-weighted reactor.

Switching loss can be reduced because a current mode of the current flowing through the first and the second reactors can be switched to any of a continuous mode, a critical mode, and a discontinuous mode based on a predetermined condition.

BRIEF DESCRIPTION OF DRAWINGS

[FIG. 1]
FIG. 1 is a configuration diagram of a converter circuit according to Embodiment 1 of the present invention.
FIG. 2 is a diagram showing an electric signal and a current waveform of each part at a continuous mode operation of the converter circuit.
FIG. 3 is a diagram showing the electric signal and the current waveform of each part at a discontinuous mode operation of the converter circuit.
FIG. 4 is a diagram showing the electric signal and the current waveform of each part at a critical mode operation of the converter circuit.
FIG. 5 is a configuration diagram of the converter circuit according to Embodiment 2 of the present invention.
FIG. 6 is a diagram illustrating the current waveform of the converter circuit.
FIG. 7 is a diagram illustrating switching operation of a current mode according to Embodiment 2 of the present invention.
FIG. 8 is a configuration diagram of the converter circuit according to Embodiment 2 of the present invention.
[FIG. 9]
FIG. 9 is a configuration diagram of the converter circuit according to Embodiment 3 of the present invention.
FIG. 10 is a configuration diagram of the converter circuit according to Embodiment 4 of the present invention.
FIG. 11 is a configuration diagram of the converter circuit according to Embodiment 4 of the present invention.
FIG. 12 is a configuration diagram of a motor drive circuit according to Embodiment 6 of the present invention.
FIG. 13 is a configuration diagram of an air-conditioner according to Embodiment 7 of the present invention.
FIG. 14 is a configuration diagram of a refrigerator according to Embodiment 8 of the present invention.

FIG. 15 is a configuration diagram of an induction heating cooker according to Embodiment 9 of the present invention.

[FIG. 16]

FIG. 16 is a diagram showing a configuration of a step-down converter and a step-up/step-down converter.

Figure 2:
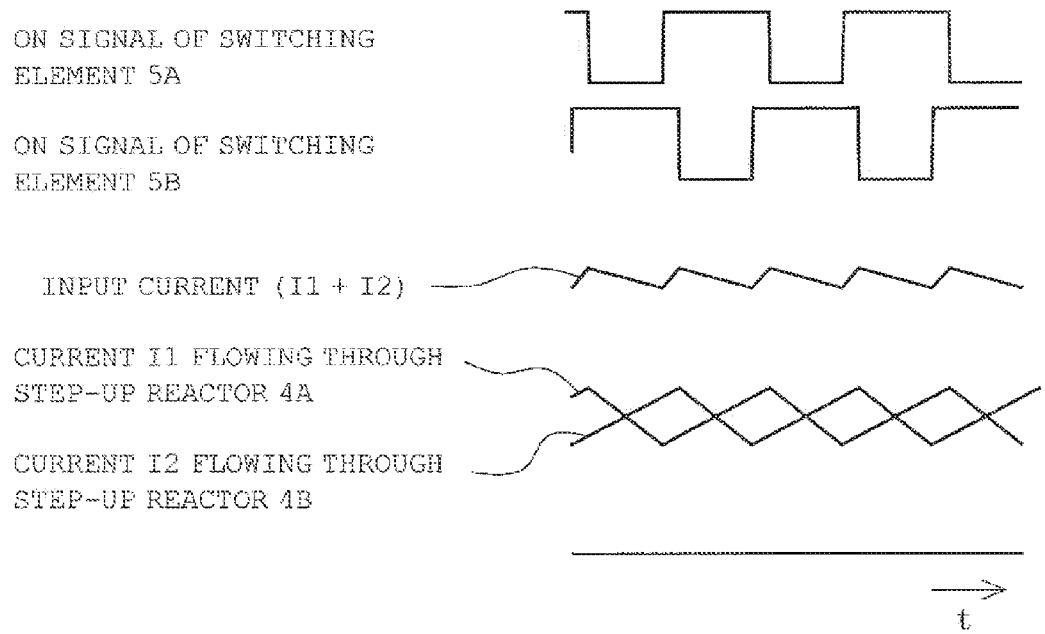
[FIG. 2]

REFERENCE SIGNS LIST 1 commercial power supply
2 rectifier
2a-2d rectifying diode
3a-3c step-up converter
4a-4c step-up reactor
5a-5c switching element
6a-6c reverse current prevention element
7 switching control means
8 smoothing capacitor
9a, 9b opening and closing means
10 load
11 inverter circuit
11a-11f switching element
12 motor
13 load circuit
14 induction heating coil
15 resonance capacitor
20 current detection means
30 output power detection means
40 opening and closing control means
50 inverter drive means
310 outdoor unit
311 refrigerant compressor.
312 blower
320 indoor unit
400 refrigerator
401 refrigerant compressor
402 cooling compartment
403 cooler
404 blower

DESCRIPTION OF EMBODIMENTS

Embodiment 1

FIG. 1 is a configuration diagram of a converter circuit according to Embodiment 1 of the present invention.

In FIG. 1, a rectifier 2 that rectifies AC voltage of the commercial power supply 1 is constituted by a bridge connection of four rectifying diodes 2a-2d. To the output of the rectifier 2, a step-up converter 3a, which is a first converter section, and a step-down converter 3b, which is a second converter section, are connected in parallel.

The step-up converter 3a is constituted by a step-up reactor 4a, which is a first reactor, a switching element 5a, which is a first switching element composed of, for example, an IGBT (Insulated Gate Bipolar Transistor), and a reverse current prevention element 6a, which is a first reverse current prevention means composed of such as a fast recovery diode. The step-up converter 3b is constituted by a step-up reactor 4b, which is a second reactor, a switching element 5b, whish is a second switching element composed of, for example, the IGBT, and the reverse current prevention element 6b, which is a second reverse current prevention element composed of, for example, the fast recovery diode. Inductance values of the step-up reactors 4a and 4b are mentioned later.

Switching of the switching elements 5a and 5b is controlled by switching control means 7 and the output of the rectifier 2 is boosted.

Switching elements 5a and 5b are provided with, a diode FWD (Free Wheeling Diode), which is connected in inverse-parallel, respectively. The diode prevents the switching element 5 from being broken caused by a surge generated when the switching element 5 turns off.

In the present embodiment, descriptions will be given to the case where the first and second converter sections are step-up converters 3a and 3b, respectively. However, the present invention is not limited thereto. An arbitrary switching converter may be applied such as a step-up converter, a step-down converter, and a step-up/step-down converter.

For example, as shown in FIG. 16(a), the step-down converter may be used for the first and the second converter sections. Alternatively, the step-up/step-down converter may be used for the first and the second converter sections.

The output of the step-up converter 3a and the step-up converter 3b is smoothed by a smoothing capacitor 8. To the output of the step-up converters 3a and 3b, a load (not shown) is connected and the smoothed output of the step-up converters 3a and 3b is applied.

Next, descriptions will be given to an inductance value of the step-up reactors 4a and 4b (hereinafter, simply referred to as a "step-up reactor 4" unless discriminated).

The inductance value L of the step-up reactor 4 configured as the above is defined by formula 1 as follows.

$$L = \frac{V_{in}^2}{\sqrt{2}\, P_{in} \cdot K \cdot f_c} \cdot \frac{V_o - \sqrt{2}\, V_{in}}{V_o} \qquad \text{Formula 1}$$

where, fc is a switching frequency, Vin an input voltage, Vo an output voltage, Pin an input power ripple rate, and K a current ripple rate.

As shown by Formula 1, the larger the current ripple rate K of the current flowing through the step-up reactor 4, the smaller the inductance value L. Accordingly, since by making the current flowing through the step-up reactor 4 to be the peak critical mode or discontinuous mode (to be mentioned later), the current value becomes larger than the average current value to increase the current ripple rate K, the inductance value L required for the step-up reactor 4 can be made small. Hence, the value obtained from the above Formula 1 is used for the inductance value L of the step-up reactor 4 when the current flowing through the step-up reactor 4 is made to be the critical mode or the discontinuous mode.

Descriptions will be given to the behavior and operation of the converter circuit configured above as follows.

As shown in FIG. 1, the AC voltage of the commercial power supply 1 is rectified by the rectifier 2. The output of the rectifier 2 is branched into two current paths by the step-up converters 3a and 3b connected in parallel. The branched current flows through the step-up reactors 4a and 4b. Switching of the switching elements 5a and 5b is controlled by switching control means 7 and the output of the rectifier 2 is boosted. The switching control means 7 controls switching of the switching elements 5a and 5b to control a current mode and a phase difference of the current flowing into the step-up reactors 4a and 4b. The switching operation will be mentioned later.

Figure 3:
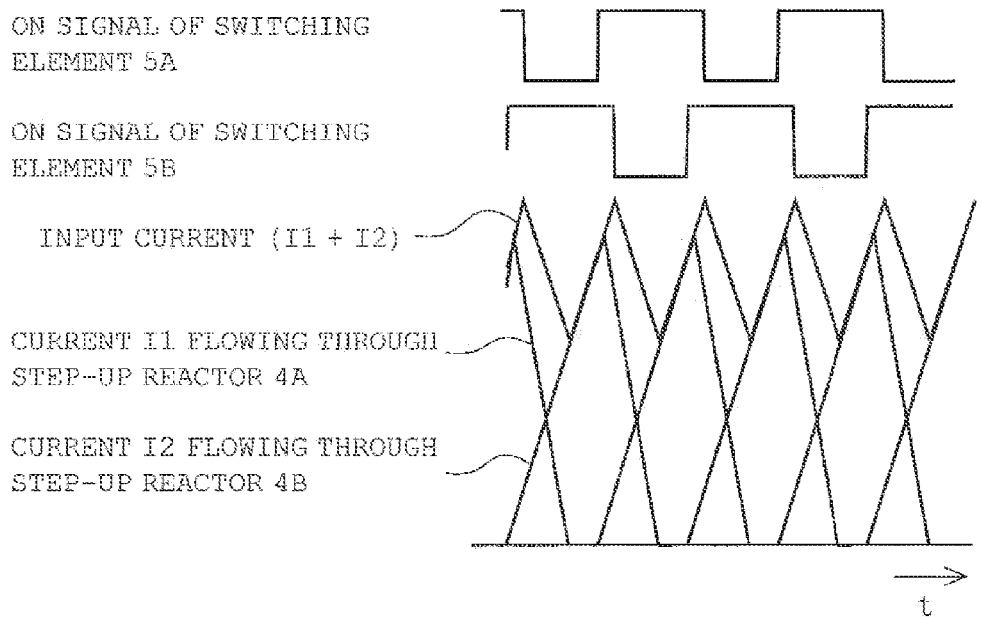
[FIG. 3]
Figure 4:
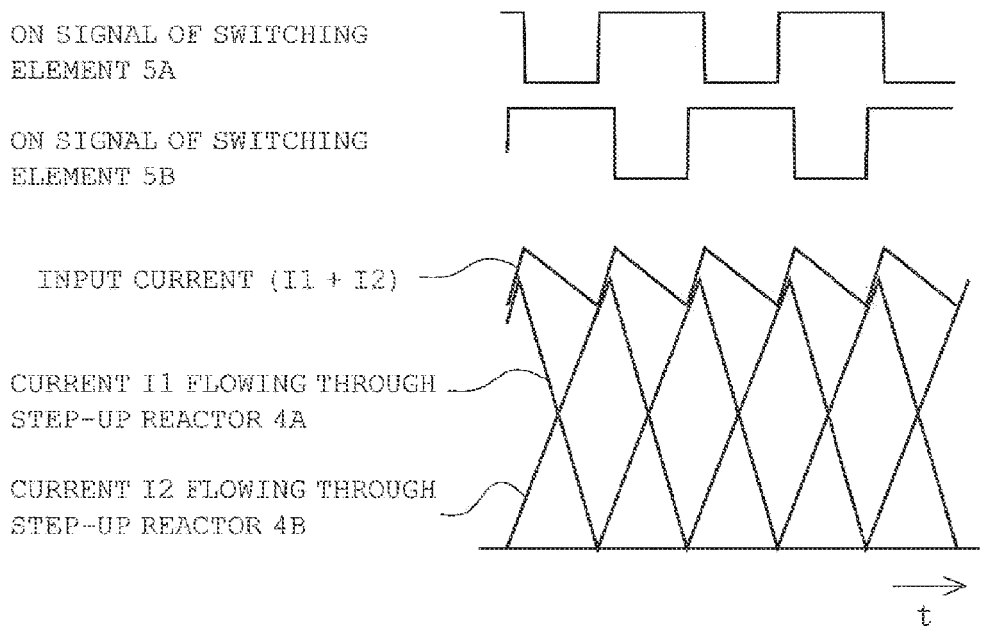
[FIG. 4]

FIG. 2 is a diagram showing an electric signal and a current waveform of each part at a continuous mode operation of the converter circuit. FIG. 3 is a diagram showing an electric signal and a current waveform of each part at a discontinuous mode operation of the converter circuit. FIG. 4 is a diagram showing an electric signal and a current waveform of each part at a critical mode operation of the converter circuit.

Next, switching operation of the step-up converters 3a and 3b will be explained.

When the switching element 5a turns on in the step-up converter 3a, conduction of a reverse current prevention element 6a is suspended and rectified voltage by the rectifier 2 is applied to the step-up reactor 4a. On the other hand, when the switching element 5a turns off, the reverse current prevention element 6a is made to conduct electricity and a reversed voltage is induced in the step-up reactor 4a to when the switching element 5a turns on.

Thus, the current flowing through the step-up reactor 4a linearly increases when the switching element 5a turns on and linearly decreases when the switching element 5a turns off.

In the step-up converter 3b, the current flowing through the step-up reactor 4b linearly increases when the switching element 5b turns on and linearly decreases when the switching element 5b turns off as well.

In the switching operation of the switching elements 5a and 5b (hereinafter, simply referred to as "switching element 5" unless discriminated) as shown in FIG. 2, the operation condition in which the current flowing through the step-up reactor 4 does not become 0 (zero) even if being reduced, is called a continuous mode. On the other hand, as shown in FIG. 3, the operation condition, in which an interval exists where the current flowing through the step-up reactor 4 decreases to 0 (zero), is called a discontinuous mode. The operation condition, in which the switching element 5 turns on at the moment when the current flowing through the step-up reactor 4 decreases to 0 (zero) while the switching element 5 turns off, is called a critical mode from a meaning that it is a boundary between the continuous mode and the discontinuous mode.

As mentioned above, the inductance value L of the step-up reactor 4 employs a value defined when the current flowing through the step-up reactor 4 is made to be the critical mode or the discontinuous mode. As shown in FIGS. 4 and 3, switching of the switching elements 5a and 5b is controlled by the switching control means 7 such that the current flowing through the step-up reactors 4a and 4b becomes the critical mode or the discontinuous mode.

The switching control means 7 controls the current flowing through the step-up reactors 4a and 4b with a phase shift so that a predetermined phase difference is created (for example, a phase difference of 180 degrees constant, respectively) as shown in FIGS. 3 and 4.

Thus, while the input currents before being branched into two current paths by the step-up converters 3a and 3b that have operated as the critical mode or the discontinuous mode in each step-up reactors 4a and 4b, respectively are added to operate as the continuous mode.

As mentioned above in the present embodiment, the step-up converter 3 is made to have two systems and operated such that the current flowing each step-up reactor 4 becomes the critical mode the critical mode or the discontinuous mode. Therefore, two components are necessary that constitutes each step-up converter 3. However, since the current flowing through the step-up reactor 4 has a large current ripple against the average current value, the inductance value L required for the step-up reactor 4 can be made small, achieving the step-up reactor 4 to be small and light-weighted.

Thereby, material cost of the step-up reactor 4 itself can be reduced, wiring can be reduced by making step-up reactor 4 on-board, and noise-resistance can be improved.

Compared with a single system step-up converter 3, the small step-up reactor 4 can be provided by dividing itself into two, allowing design intending to improve degree-of-freedom of installing components in the circuit, to improve assembling efficiency, and to reduce mistakes.

Further, by making the step-up reactor 4 occupying a greater part of circuitry capacity small and light-weighted, it becomes possible to reinforce merits such as to make the product itself small and light-weighted.

By making the product itself small, it becomes possible to make packaging of the relevant product light-weighted and small to achieve reduction in packaging volume.

In the step-up converter 3, an FWD is provided in inverse-parallel to the switching elements 5a and 5b. Because of this, the switching element 5 can be protected from breakdown caused by a surge generated in the wiring impedance where one end of the step-up reactor 4, one end of the switching element 5, and one end of the reverse current prevention element 6 are connected when the switching element 5 turns off.

Since the current flowing through the step-up reactor 4 is controlled with phase shift, the input current can be operated in the continuous mode while each step-up reactor 4 is operated in the critical mode or the discontinuous mode. Harmonics currents of the input current can be suppressed, resultantly.

When comparing with the single system step-up converter 3 in the discontinuous mode or the critical mode, the current flowing through each element of the step-up converter 3 is almost halved, therefore, a small capacity element can be selected for the step-up reactor 4, the switching element 5, and the reverse current prevention element G.

As mentioned above, the input current is an addition of currents flowing through the step-up reactors 4a and 4b. Thereby, if the phase difference of currents flowing the step-up reactors 4a and 4b is controlled by 180 degrees (reverse phase) in the switching control means 7, the level of the current ripple of the input current becomes the smallest, allowing to reduce high-frequency components of the input current. Then, the frequency of the current ripple of the input current is twice the switching frequency.

A case is conceivable where the current ripple of the input current causes noises or vibrations at the doubled frequency of the switching frequency when controlling the phase difference by 180 degrees (reverse phase). In this case, by controlling the phase difference of the current flowing through the step-up reactors 4a and 4b to randomly vary within a predetermined range such as a random value around 180 degrees instead of 180 degrees constant, the component of the doubled switching frequency can be reduced and the noise can be suppressed.

An example will be explained of method for generating a random value of the phase difference. Inside the switching control means 7, in the phase difference calculation section (not shown) that obtains random numbers in the range of, for example, −1 to 1 from a random number generation section (not shown), a difference of the phase difference is calculated by multiplying the maximum value 180 degrees of the difference of the phase difference by the random number. Here, by adding the difference to the phase difference 180 degrees, a random number centering around 180 degrees is obtained as phase difference of the current flowing through the step-up reactors 4a and 4b.

Thereby, it becomes possible to suppress the current ripple, noises or vibrations dependent on the switching frequency without making each switching frequency of the switching elements 5a and 5b different.

When employing random numbers for the phase difference, some case is conceivable where the tone of noises is felt as if the level of the sound were totally increased from the sound having a rising peak. Then, by narrowing the range of the random number obtained from a random number generation section, such as, −0.5 to 0.5 or −0.3 to 0.3, noise level and tone can be adjusted.

Embodiment 2

In Embodiment 1, operation is performed so that the current mode flowing through the step-up reactor 4 becomes the critical mode or the discontinuous mode. In Embodiment 2, by switching the current mode during operation, operation taking advantage of each current mode is possible.

Here, descriptions will be given to characteristics of each current mode.

When controlled by the continuous mode, the current ripple is smaller than the critical mode and the discontinuous mode, allowing to suppress the generation of harmonics components of the input current. On the other hand, the switching frequency becomes higher than the critical mode and the discontinuous mode, causing a large switching loss in the switching element 5 and the reverse current prevention element 6.

When operated in the critical mode, the current ripple rate becomes smaller than the discontinuous mode, enabling generation of the high-frequency components of the input current to be suppressed. On the other hand, the switching frequency becomes higher than the discontinuous mode, causing a large switching loss in the switching element 5 and the reverse current prevention element 6.

When operated in the discontinuous mode, since the current ripple in the input current is larger compared with the continuous mode and the critical mode, suppressing effect of the harmonics components of the input current is small. On the other hand, the switching frequency becomes lower than the critical mode and the discontinuous mode, causing a small switching loss in the switching element 5 and the reverse current prevention element 6.

Thus, the switching control means 7 in Embodiment 2 switches the mode of the current flowing through the step-up reactors 4a and 4b into any of the continuous mode, the critical mode, and the discontinuous mode based on a predetermined condition.

The predetermined condition to switch the current mode and concrete examples will be explained.

Firstly, as the predetermined condition to switch the current mode, operation based on the input current will be explained.

Figure 5:
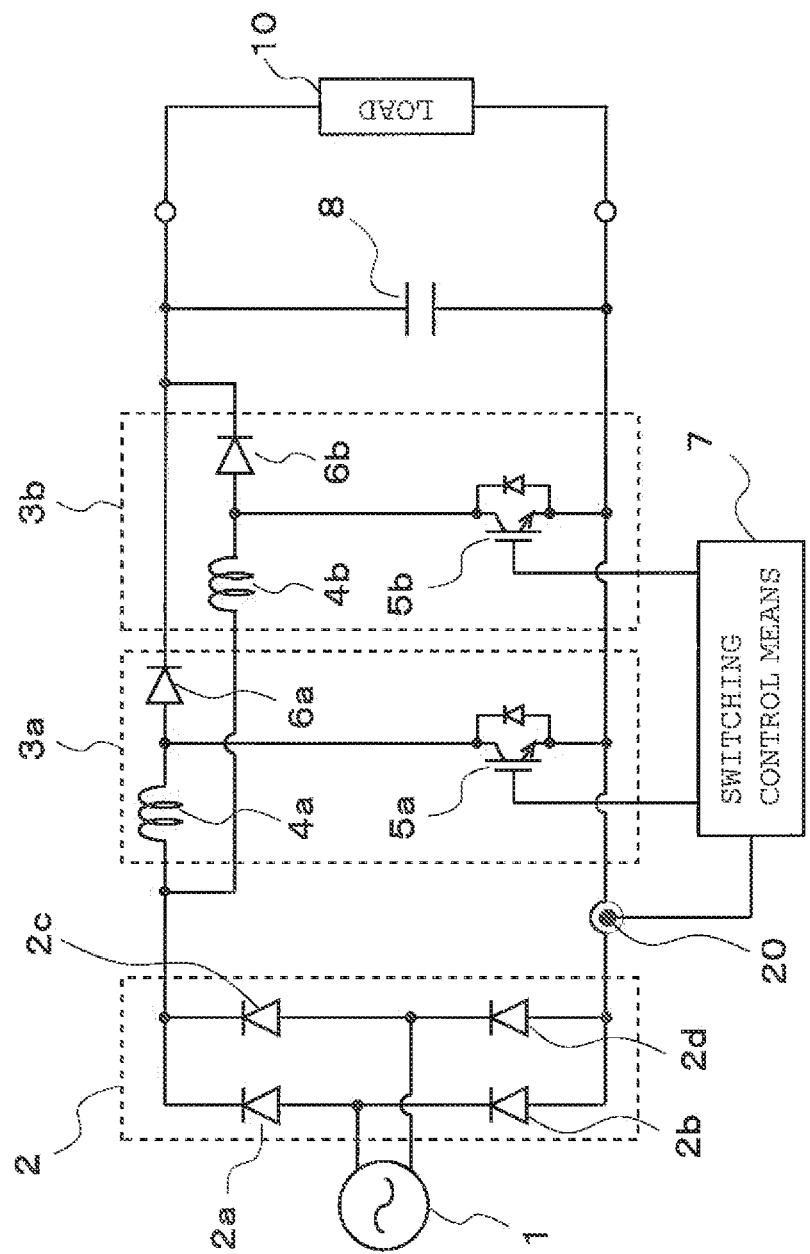
[FIG. 5]

FIG. 5 is a configuration diagram of the converter circuit according to Embodiment 2 of the present invention.

In FIG. 5, the converter circuit further includes current detection means 20 that detects the input current input to the step-up converters 3a and 3b in addition to the configuration of the above Embodiment 1.

The other configuration is the same as that of Embodiment 1, and the same signs will be given to the same configuration.

The inductance value L of the step-up reactor 4 employs the value defined by the above Formula 1 when the current flowing through the step-up reactor 4 is in the critical mode. The critical mode is switched to the discontinuous mode to be mentioned later. Therefore, it is necessary to define the value L in the critical mode in which the current ripple is smaller.

Based on the above configuration, the switching control means 7 switches the mode of the current flowing through the step-up reactor 4 based on the magnitude (level) of the input current detected by current detection means 20.

The switching control means 7 is set with 30% of the peak value of the input current being a threshold, for example. When the magnitude (level) of the detected input current is equal to or larger than the threshold, switching of the switching element 5 is controlled so that the current flowing through the step-up reactor 4 becomes the critical mode. On the other hand, when the magnitude (level) of the detected input current is less than the threshold, switching of the switching element 5 is controlled so that the current flowing through the step-up reactor 4 becomes the discontinuous mode.

Figure 6:
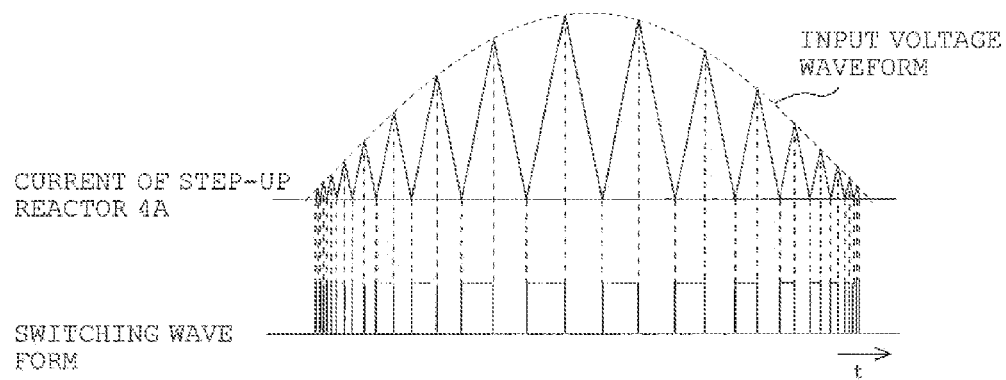
[FIG. 6]
Figure 7:
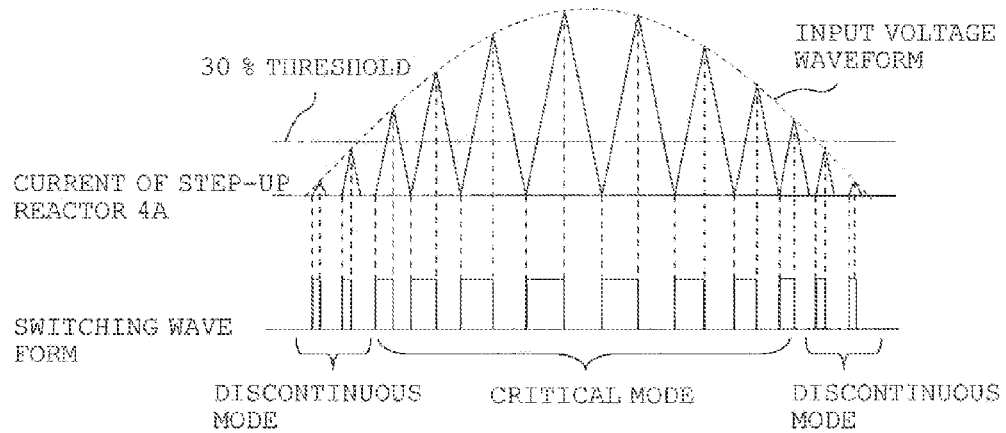
[FIG. 7]

FIG. 6 is a diagram illustrating the current waveform of the converter circuit. FIG. 7 is a diagram illustrating switching operation of the current mode according to Embodiment 2 of the present invention.

In FIGS. 6 and 7, the current waveform and switching waveform of the step-up reactor 4a shown in FIG. 4 are expressed with the time axis being magnified. Waveforms shown in FIGS. 6 and 7 are typically shown for expressing the switching operation, not being the actually measured waveforms. The switching frequency of the switching element 5 is substantially shorter than that of the commercial power supply 1 (input voltage waveform).

As shown in FIG. 6, the current in the critical mode varies in proportion to the input voltage input to the step-up converter 3a. The switching frequency becomes low in the vicinity of the peak of the current and high in the vicinity of the zero cross point.

FIG. 7 shows the current waveform and switching waveform when the current mode is switched based on the above operation. As shown in FIG. 7, in the vicinity of the peak of the current, the operation becomes the critical mode, and in the vicinity of the zero cross point the discontinuous mode.

From the above operations, in the vicinity of the peak region where the input current is large, the switching frequency becomes high compared with the discontinuous mode by making the current mode to be the critical mode, however, contribution of the input current to the suppression of harmonics components is large in the critical current mode. Accordingly, the effect of suppressing the harmonics components can be maintained.

In the vicinity of the zero cross where the input current is small, when compared with the critical mode, the effect of suppressing the harmonics components becomes smaller by making the current to be the discontinuous mode, however, the switching loss can be decreased by reducing the switching frequency.

In the above, explanations are given to the case where the threshold is 30% of the input current, however, the present invention is not limited thereto. For example, by setting the threshold larger such as 50% of the input current, the range of the discontinuous mode can be expanded, allowing to reduce much more switching loss.

Further, by setting the threshold smaller such as 10% of the input current, the range of the critical mode can be expanded, allowing to reduce much more harmonics components of the input current.

Next, operation based on the switching frequency will be explained as the predetermined condition to switch the current mode.

As shown in the above FIG. 6, in the operation of the critical mode, the switching frequency cannot be kept constant, but being low in the vicinity of the peak of the input current and being high in the vicinity of the zero cross. Thus, switching control means 7 switches the mode of the current flowing through the step-up reactors 4a and 4b based on the switching frequency of the switching element 5.

With the switching control means 7, a predetermined frequency is set as the threshold in advance. In the switching control of the switching element 5, if the switching frequency is less than the threshold, the mode of the current flowing through the step-up reactor 4 is switched into the critical mode. On the other hand, if the switching frequency is equal to or larger than the threshold, the mode of the current flowing through the step-up reactor 4 is switched into the discontinuous mode.

From the above operations, in the vicinity of the peak region where the switching frequency is low, the switching frequency becomes high compared with the discontinuous mode by making the current mode to be the critical mode, however, contribution of the input current to the suppression of harmonics components is large in the critical mode. Accordingly, the effect of suppressing the harmonics components can be maintained.

In the vicinity of the zero cross where the switching frequency is high, when compared with the critical mode, the effect of suppressing the harmonics components becomes smaller, however, the switching loss can be decreased by reducing the switching frequency.

If the threshold of the switching frequency set at the switching control means 7 is made to conform to the specification of the switching element 5, the switching element 5 can be prevented from breakdown and used in more suitable environment.

Next, operation based on the output voltage will be explained as the predetermined condition to switch the current mode.

In the operation of the critical mode, the higher the load, the lower the switching frequency for the output voltage. Thereby, the switching control means 7 switches the current mode flowing through the step-up reactor 4 based on the output voltage.

Figure 8:
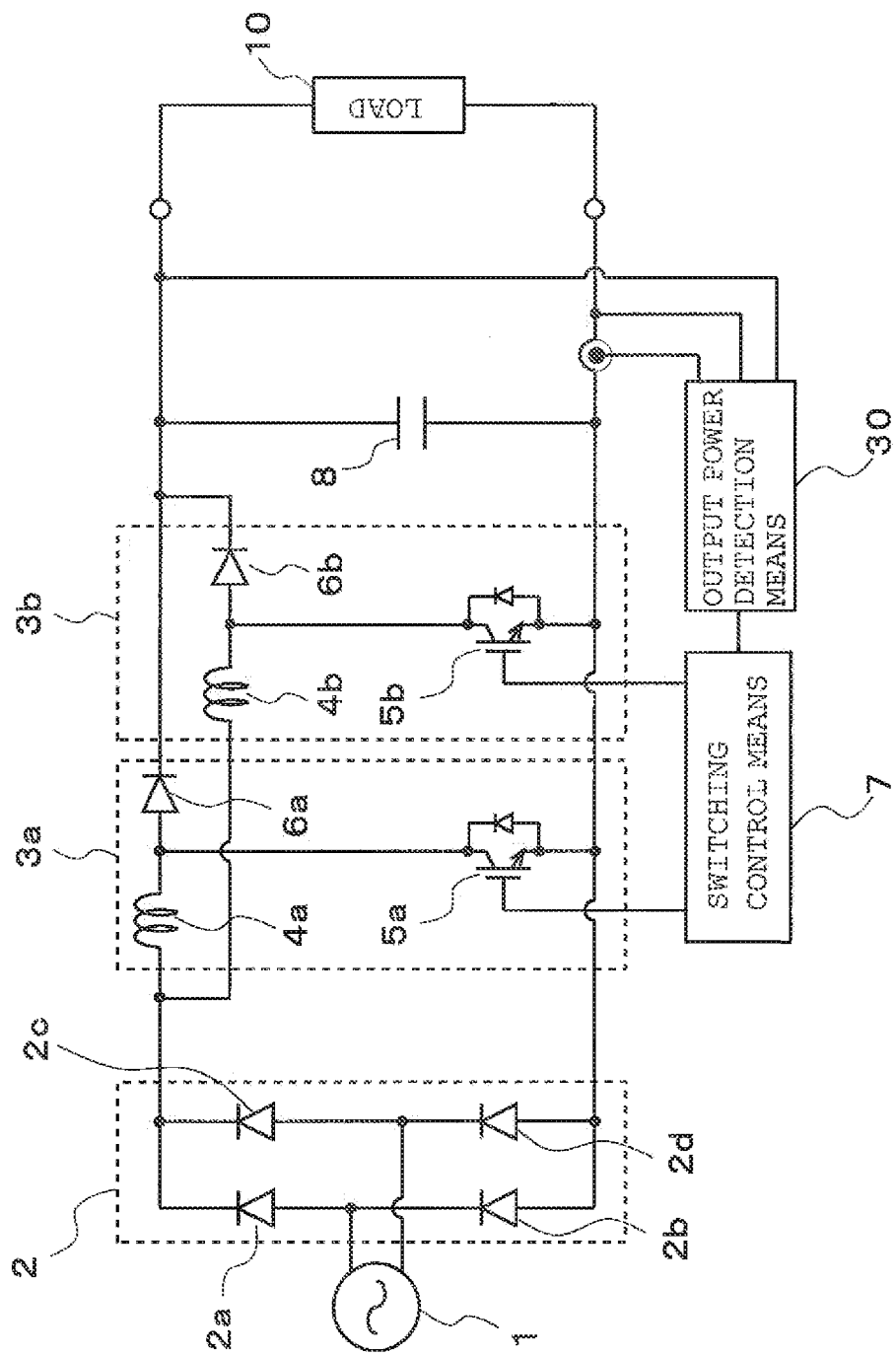
[FIG. 8]

FIG. 8 is a configuration diagram of a converter according to Embodiment 2 of the present invention.

In FIG. 8, the converter circuit is further provided with output power detection means 30 that detects the output power of the step-up converters 3a and 3b in addition to the configuration of Embodiment 1. The other configurations are the same as that of Embodiment 1. The same signs will be given to the same configurations.

Like FIG. 5, the inductance L of the step-up reactor 4 employs the value defined by the above formula 1 when the current flowing therethrough is made to be the critical mode.

With the configuration above, the switching control means 7 switches the current mode flowing through the step-up reactor 4 based on the output voltage detected by the output power detection means 30.

A predetermined output power is set at the switching control means 7 as the threshold. When the detected output power is equal to or larger than the threshold, the switching element 5 is controlled such that the current mode flowing through the step-up reactor 4 becomes the critical mode. When the detected output power is less than the threshold, the switching element 5 is controlled such that the current mode flowing through the step-up reactor 4 becomes the discontinuous mode.

From the above operations, in the case of high load, the switching frequency is high compared with the discontinuous mode by making the current mode to be the critical mode, however, contribution of the input current to the suppression of harmonics components is large in the critical current mode. Accordingly, the effect of suppressing the high-frequency components can be maintained.

In the case of low load, when compared with the critical mode, the effect of suppressing the harmonics components becomes smaller by making the current mode to be the disconnection mode, however, the switching loss can be decreased by reducing the switching frequency.

When providing a threshold with the above-mentioned input current and the switching frequency, and the current mode is switched based on the output voltage like the above, since switching of the current mode is less frequent than the case where the current mode is frequently switched within a time period of the power source, a simpler program can perform the control.

Next, descriptions will be given to operations based on the circuit efficiency as predetermined conditions for switching the current mode.

In the low-load area, the circuit efficiency improves with the increase in the output voltage. However, in the high-load area, the circuit efficiency sometimes decreases. Thereby, the switching control means 7 switches the current mode flowing through the step-up reactor 4 based on the circuit efficiency.

The converter circuit includes the current detection means 20 shown in the above-mentioned FIG. 5 and the output power detection means 30 shown in the above-mentioned FIG. 8. The other configurations are the same as that of Embodiment 1.

Based on the above-mentioned configuration, with the switching control means 7, the predetermined circuit efficiency is set as the threshold.

The switching control means 7 obtains the circuit efficiency based on the detected input current and the output power. Then, if the obtained circuit efficiency is less than the threshold, when the mode of the current flowing through the step-up reactor 4 is the critical mode, it is switched into the discontinuous mode. When the continuous mode, it is switched into the critical mode or the discontinuous mode.

Through the above-mentioned operations, when the circuit efficiency is lowered, the switching frequency is reduced to decrease the switching loss and the circuit efficiency can be improved.

Next, as the predetermined condition for switching the current mode, operations will be explained based on the output voltage, the output voltage command, or the changed values of the output voltage command.

When the output voltage command is changed against the step-up converter 3, the ripple of the input current is changed. Therefore, the switching control means 7 switches the mode of the current flowing through the step-up reactor 4 based on the output voltage, the output voltage command, of the changed values of the output voltage command.

Into the switching control means 7, information on the output voltage command that specifies the output voltage of the step-up converter 3 is input. Then, the switching control means 7 controls the switching element 5 according to the input output voltage command to specify the output voltage of the step-up converter 3.

In the switching control means 7, a predetermined value or a range is preset as a threshold, with which the current ripple becomes large against the output voltage, the output voltage command, or the changed values of the output voltage. The other configurations, are the same as that of Embodiment 1.

For the inductance value L of the step-up reactor 4, a value defined by the above formula 1 is employed when the current flowing through the step-up reactor 4 is in the continuous mode. The object is to make it operate in the continuous mode in which the current ripple is smaller.

Based on the above-mentioned configuration, the switching control means 7, switches the mode of the current flowing through the step-up reactor 4 into the continuous mode when the output voltage, the output voltage command, or the changed value of the output voltage command is the predetermined value or in the region where the current ripple becomes large.

Through the above-mentioned operations, when the output voltage command is changed and the current ripple becomes large, the current can be switched into the continuous mode where the current ripple is smaller to be able to suppress the harmonics component.

Embodiment 3

In the above-mentioned Embodiments 1 or 2, descriptions are given to the case where the step-up converter has two systems. In Embodiment 3, the converter of three or more systems will be employed.

FIG. 9 is a configuration diagram of the converter circuit according to Embodiment 3 of the present invention.

As shown in FIG. 9, the converter circuit in Embodiment 3 includes the step-up converter $3c$ connected with the step-up converters $3a$ and $3b$ in parallel in addition to the configuration of Embodiment 1.

The step-up converter $3c$ is constituted by the step-up reactor $4c$, which is the reactor of the present invention, and such as IGBT, a switching element $5c$, which is a switching element of the present invention, such as a fast recovery diode, and a reverse current prevention element $6c$, which is a reverse current prevention element of the present invention. The other configurations are the same as that of Embodiment 1. The same signs will be given to the same configurations.

Such a configuration allows the input current, which is an addition of currents flowing through each step-up reactor 4, to have much smaller current ripple to further improve the harmonics current suppression effect.

The current flowing through the step-up reactor 4, switching element 5, reverse current prevention element 6 of each step-up converter 3 becomes further smaller and elements having further smaller capacity can be selected.

FIG. 9 shows a case where the step-up converter 3 has three systems, however, the present invention is not limited thereto. The step-up converter 3 may be connected for an arbitrary number (N) that is three systems or more in parallel.

As explained in the above Embodiment 1, the input current is the addition of currents flowing through each step-up reactor 4. For example, when N systems of the step-up converter are connected in parallel, the current ripple of the input current becomes minimum at 360/N degrees. Thereby, the current ripple frequency of the input current becomes N times of the switching frequency.

Then, the current ripple of the input current may cause noises at the frequencies which is N times of the switching frequency. Thereby, by controlling the phase difference of the current flowing through each step-up reactor to be made to change only for several times in the vicinity of 360/N, components of N times of the switching frequency can be reduced and noises can be suppressed.

The change of the phase difference can be changed at random by a phase difference calculation section and the like within a predetermined area like the above Embodiment 1.

The larger the number of the system of the step-up converter 3, the smaller the current ripple of the input current. Accordingly, the harmonics components suppression effect of the input current can be improved. A noise filter can be made small.

The current flowing through the step-up reactor 4, switching element 5, reverse current prevention element 6 can be made smaller and elements having much smaller capacity can be selected.

The mode of the current flowing through the step-up reactor 4 can be switched into any of the continuous mode, the critical mode, or the discontinuous mode based on trade-off between the number (N) of the system of the step-up converter 3 and the current mode. For example, a variety of configurations are possible such as a configuration operable under the continuous mode when focusing on the suppression effect of the harmonics components, the configuration operable under the critical mode when focusing on small and light-weighted type, a configuration operable under the discontinuous mode when focusing on low loss.

Embodiment 4

Figure 10:
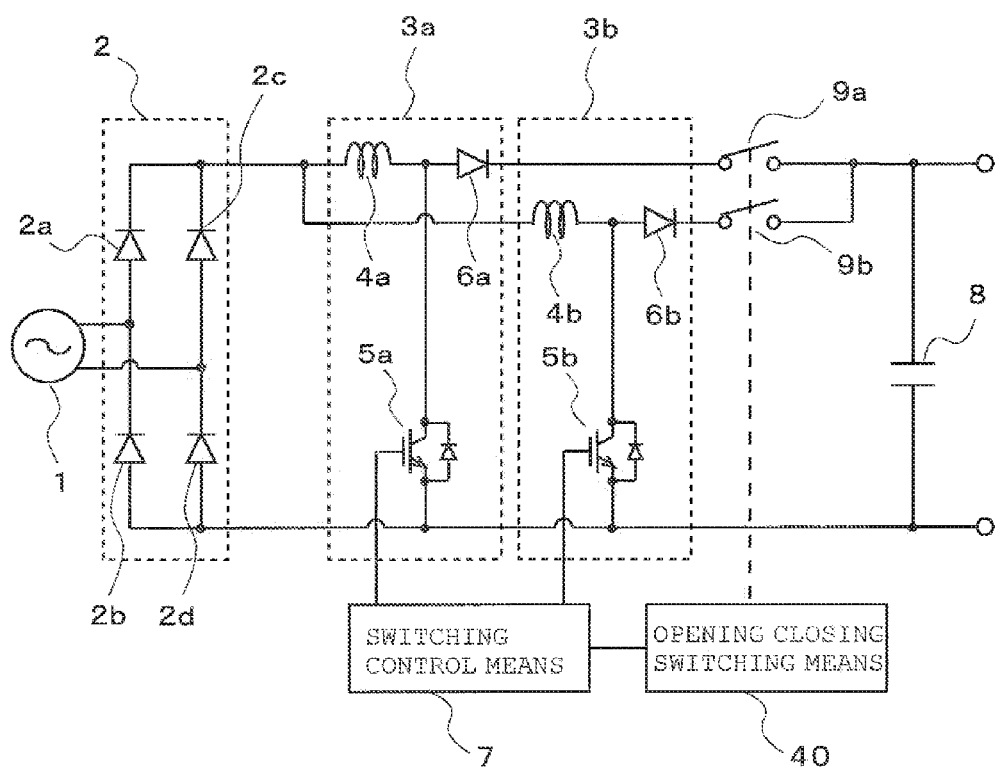
[FIG. 10]

FIG. 10 is a configuration diagram of the converter circuit according to Embodiment 4 of the present invention. in FIG. 10, the rectifier 2 that rectifies the AC voltage of the commercial power supply 1 is configured to bridge-connect four rectifying diodes $2a$ to $2d$. To the output of the rectifier 2, the step-up converter $3a$ and the step-up converter $3b$ are connected in parallel.

The step-up converter $3a$ is composed of the step-up reactor $4a$, switching element $5a$ such as an IGBT, the reverse current prevention element $6a$ such as a fast recovery diode.

The step-up converter $3b$ is also composed of the step-up reactor $4b$, the switching element $5b$ such as an IGBT, the reverse current prevention element $6bv$ such as a fast recovery diode.

The switching elements $5a$ and $5b$ are controlled by the switching control means 7 to boost the output of the rectifier 2. The inductance L of the step-up reactors $4a$ and $4b$ employs the values defined by the above formula 1 when the current flowing therethrough is made to be the critical mode or discontinuous mode like the above-mentioned Embodiment 1.

Switching elements $5a$ and switching elements $5b$ are provided with a FWD connected in inverse-parallel, respectively. The diode prevents the switching element 5 from being broken caused by a surge generated when the switching element 5 turns off.

In the present embodiment, the step-up converter 3 is not limited, but any switching converter can be applied such as a step-up converter, a step-down converter, a step-up/step-down converter.

The output of the step-up converter $3a$ and the step-up converter $3b$ is smoothed by the smoothing capacitor 8. To the output of the step-up converters $3a$ and $3b$, a load (not shown) is connected and the output of the smoothed step-up converters $3a$ and $3b$ is applied.

To the output side of the step-up converter $3a$, opening and closing means $9a$ is provided composed of a switching element that opens and closes the output of the step-up converter $3a$. To the output side of the step-up converter $3b$, opening and closing means $9b$ is provided composed of a switching element that opens and closes the output of the step-up converter $3b$. The opening and closing control means 40 is provided that controls the opening and closing of the opening and closing means $9a$ and $9b$.

Descriptions will be given to the behavior and operation of the converter circuit configured above as follows.

If both opening and closing means $9a$ and $9b$ are on state, the circuit configuration is the same as that of the above Embodiment 1. The AC voltage of the commercial power supply 1 is rectified by the rectifier 2 like the above Embodiment 1. The output of the rectifier 2 is branched into two current paths by the step-up converters $3a$ and $3b$ connected in parallel. The branched current flows into the step-up reactors $4a$ and $4b$, switching of the switching elements $5a$ and $5b$ being controlled by the switching control means 7, and the output of the rectifier 2 being boosted. The switching control means 7 controls switching of the switching elements $5a$ and $5b$ to control the current mode and phase difference of the current flowing through the step-up reactors $4a$ and $4b$. The switching operation is the same as that of the above Embodiment 1.

When both opening and closing means 9a and 9b are on-state, the same effect as the above Embodiment 1 can be obtained.

Next, descriptions will be given to switching operation of use conditions of the step-up converters 3a and 3b by the opening and closing means 9a and 9b.

As shown in FIG. 10, the converter circuit of the present embodiment is provided with the opening and closing means 9a and 9b controlled by the opening and closing control means 40.

The opening and closing control means 40 opens and closes at least either of the opening and closing means 9a or 9b based on a predetermined condition to operate both or either of the step-up converters 3a or 3b. That is, when the opening and closing means 9a is made to on and the opening and closing means 9b is made to off, the step-up converter 3a can be made to be a used state and the step-up converter 3b can be made to be a stop state. Alternatively, when the opening and closing means 9a is made to off and the opening and closing means 9b is made to on, the step-up converter 3a can be made to be the stop state and the step-up converter 3b can be made to be the used state.

Switching of use conditions of the step-up converters 3a and 3b by the opening and closing means 9a and 9b (hereinafter, simply referred to as "use conditions") is performed by providing a threshold value with the input current level, the switching frequency, the circuit efficiency, the output power, and so on. Descriptions will be given to the predetermined condition to switch the use conditions and concrete examples thereof as follows.

Firstly, as the predetermined condition for switching the use conditions, the operation based on the input current will be explained.

In addition to the configuration of the above-mentioned FIG. 10, current detection means 20 is provided that detects the input current input to the step-up converters 3a and 3b like the above-mentioned Embodiment 2 (FIG. 5).

The opening and closing control means 40 switches on-off of the opening and closing means 9a and 9b based on the magnitude (level) of the input current detected by the current detection means 20.

The opening and closing control means 40 is set with 30% of the peak value of the input current being the threshold, for example. When the magnitude (level) of the detected input current is equal to or larger than the threshold, both opening and closing means 9a and 9b are made to be on and both step-up converters 3a and 3b are made to be in the used state.

On the other hand, when the magnitude (level) of the detected input current is less than the threshold, either the opening and closing means 9a or 9b is made to be on and the other off, and either step-up converters 3a or 3b is made to be in the used state.

Through the above-mentioned operations, in the vicinity of the peak having a large input current, since the input current is divided into the route of the step-up converter 3a and the route of 3b by making both of them to be a used condition, the current flowing through the components of each step-up converter 3 can be suppressed.

In the vicinity of the zero cross having a small input current, by making either the step-up converter 3a or 3b to be the used condition, no operation loss occurs in the step-up converter 3 under the stop state, allowing to reduce circuit loss.

Next, descriptions will given to operations based on the switching frequency as the predetermined condition for switching the use conditions.

As shown in Embodiment 2 (FIG. 6), the switching frequency cannot be made to be constant during the operation in the critical mode. While the switching frequency is low in the vicinity of the peak of the input current, it is high in the vicinity of the zero cross. Thereby, the opening and closing control means 40 switches on-off of the opening and closing means 9a and 9b based on the switching frequency of the switching element 5.

In the opening and closing control means 40, a predetermined frequency is set as a threshold. Into the opening and closing control means 40, information on the switching frequency is input from the switching control means 7. If the switching frequency is less than the threshold, both opening and closing means 9a and 9b becomes on and both step-up converters are made to be the used state.

On the other hand, if the switching frequency is equal to or more than the threshold, either opening and closing means 9a or 9b becomes on and the other off, and either step-up converter 3a or 3b becomes the used state.

Through the above-mentioned operations, in the region having a low switching frequency, since the input current is divided into the route of the step-up converter 3a and the route of 3b by making both of them to be a used state, the current flowing through the components of each step-up converter 3 can be suppressed.

In the region where the switching frequency is high, by making either the step-up converter 3a or 3b to be a used state, no operation loss occurs in the step-up converter 3 under the stop state, allowing to reduce circuit loss.

If the threshold of the switching frequency set at the opening and closing control means 40 is set according to the specification of the switching element 5, for example, the switching element 5 can be prevented from breakdown and used under more favorable environment.

Next, descriptions will be given to operations based on the output voltage as the predetermined condition for switching the use conditions.

During the operation in the critical mode, regarding the output power, the higher the load, the lower the switching frequency. Therefore, the opening and closing control means 40 switches on-off of the opening and closing means 9a and 9h based on the output power.

In addition to the above-mentioned configuration of FIG. 10, like Embodiment 2 (FIG. 8) the above, the output power detection means 30 is provided that detects the output power of the step-up converters 3a and 3b.

The opening and closing control means 40 switches on-off of the opening and closing means 9a and 9b based on the output power detected by the output power detection means 30.

With the opening and closing control means 40, a predetermined output power is set as a threshold in advance. When the detected output power is equal to or larger than the threshold, both opening and closing means 9a and 9b are turned on and both step-up converters 3a and 3b are made to be the used state.

On the other hand, when the detected output power is less than the threshold, either opening and closing means 9a or 9b is turned on and the other off, and either step-up converter 3a or 3b is made to be the used state.

Through the above-mentioned operations, in the case of the high load, since the input current is divided into the route of the step-up converter 3a and the route of 3b by making both of them to be the used state, the current flowing through the components of each step-up converter 3 can be suppressed.

In the case of the low load, by making either the step-up converter 3a or 3b to be the used state, no operation loss occurs in the step-up converter 3 under the stop state, allowing to reduce circuit loss.

While the current mode is frequently switched within a power source cycle in the case where a threshold is provided for the above-mentioned input current and the switching frequency, the frequency of on-off switching is low for the opening and closing means 9a and 9b when the current mode is switched based on the output power like the above, allowing to perform control with a simpler program.

Next, descriptions will be given to operations based on the circuit efficiency as the predetermined condition for switching the use condition.

In the low load area, the circuit efficiency increases as the output power increases, however, in the high load area, the circuit efficiency sometimes decreases. Therefore, the opening and closing control means 40 switches on-off of the opening and closing means 9a and 9b based on the circuit efficiency.

In addition to the above-mentioned configuration of FIG. 10, the current detection means 20 and the output power detection means 30 are provided. With the opening and closing control means 40, a predetermined circuit efficiency value is set as a threshold in advance.

The opening and closing control means 40 obtains the circuit efficiency based on the detected input current and the output power. When the obtained circuit efficiency value is less than the threshold, either opening and closing means 9a or 9b is turned on, the other off, and either step-up converter 3a or 3b is made to be the used state. On the other hand, when the circuit efficiency value is equal to or larger than the threshold, both opening and closing means 9a and 9b are turned on and both step-up converters 3a and 3b are made to be the used state.

Through the above-mentioned operations, by making either step-up converter 3a or 3b to be in the used state when the circuit efficiency is decreased, no operation loss occurs in the step-up converter 3 under the stop state, allowing to improve the circuit efficiency.

Next, as the predetermined condition for switching the use condition, operations will be explained based on the output voltage, the output voltage command, or the changed values of the output voltage command.

When changing the output voltage command against the step-up converter 3, the current ripple of the input current changes as well. Thereby, the opening and closing control means 40 switches on-off of the opening and closing means 9a and 9b based on the output voltage, the output voltage command, or the changed value of the output voltage command.

To the switching control means 7, the output voltage command that sets the output voltage of the step-up converter 3 is input. The switching control means/controls the switching element 5 according to the output voltage command to set the output voltage of the step-up converter 3.

To the opening and closing control means 40, information on the output voltage command is input. To the opening and closing control means 40, the predetermined value or range is set in advance as the threshold, for which the current ripple becomes large against the output voltage, the output voltage command; or the changed values of the output voltage command.

The opening and closing control means 40 turns both opening and closing means 9a and 9b on and makes both step-up converters 3a and 3b to be used state when the output voltage, the output voltage command, or the changed value of the output voltage command is the predetermined value or in the area.

Through the above-mentioned operations, by making both step-up converters 3a and 3b to be the used state, the current ripple of the input current can be made small and harmonic components can be suppressed when the output voltage command changes and the current ripple increases.

Next, descriptions will be given to operations of switching by an arbitrary period as the predetermined condition for switching the use condition.

If the use condition is maintained for both or either step-up converter 3a or 3b, the temperature increases of each element constituting the step-up converter 3. Thereby, the opening and closing control means 40 switches on-off of the opening and closing means 9a and 9b at an arbitrary period to switch the used state and the stop state of the step-up converters 3a and 3b at an arbitrary period.

Through such operations, temperature rise in the step-up reactor 4, switching element 5, and reverse current prevention element 6 constituting the step-up converter 3 can be suppressed and the converter circuit can be more efficiently operated.

By suppressing temperature rise in each element, breakdown of elements due to excess operation temperature can be prevented and long term usage becomes possible.

In Embodiment 4, by adjusting the phase difference of the current flowing through the step-up reactors 4a and 4b to be 180 degrees or a random value centering around 180 degrees, harmonics of the input current and noise vibrations caused by the current ripple can be suppressed.

Figure 11:
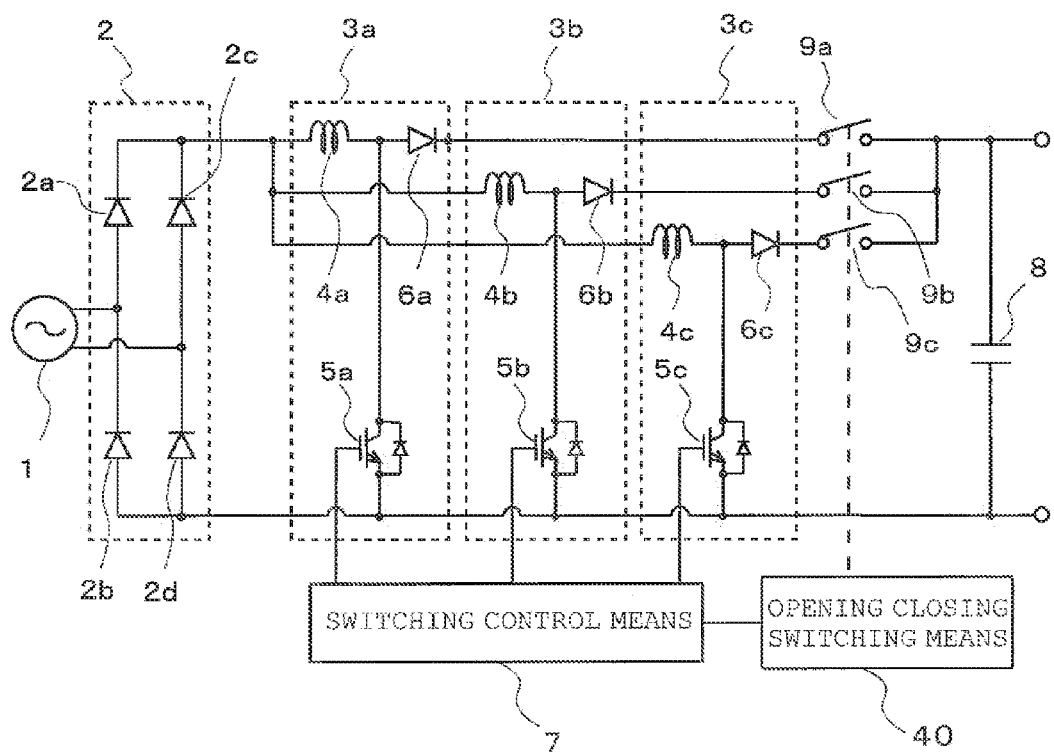
[FIG. 11]

In Embodiment 4, the case where the step-up converter 3 has two systems is explained. However, the present invention is not limited thereto, but a plurality of systems may be connected in parallel for the step-up converter 3 as shown in FIG. 11, for example. Through such a configuration, the same effect as Embodiment 3 can be obtained.

Embodiment 5

In the above Embodiment 2, the current mode flowing through the step-up reactors 4 is switched based on the predetermined condition. In Embodiment 4, the use condition of the step-up converters 3a and 3b is switched based on the predetermined condition. In Embodiment 5, the switching of the use condition of the step-up converters 3a and 3b and the switching of the current mode flowing through the step-up reactors 4 are performed simultaneously based on the predetermined condition.

Descriptions will be given to the predetermined condition to switch the used condition and the current mode and concrete examples thereof as follows. The configuration of the converter circuit in Embodiment 5 is the same as that in Embodiment 4.

Firstly, as the predetermined condition for switching the use condition and the current mode, operations will be explained based on the input current.

Like the above Embodiment 4, when the magnitude (level) of the input current detected by the current detection means 20 is equal to or larger than the threshold, the opening and closing control means 40 turns both opening and closing means 9a and 9b on and makes both step-up converters 3a and 3b to be used state. The switching control means 7 controls the switching of the switching element 5 so that the current mode flowing through the step-up reactor 4 is made to be the critical mode or the discontinuous mode.

When the magnitude (level) of the detected input current is less than the threshold, the opening and closing control means 40 turns either opening and closing means 9a or 9b on and the other off to make either step-up converter 3a or 3b to be used state. The switching control means 7 controls the switching of the switching element 5 so that the current mode flowing through the step-up reactor 4 is made to be the continuous mode.

Through such operations, in the area near the peak where the input current is large, by making both step-up converters 3a and 3b to be used state and making the current mode to be the critical mode or the discontinuous mode, not only the current flowing through components of each step-up converter 3 can be suppressed, but also the current ripple flowing through the step-up reactor 4 can be made large, and the switching loss can be reduced because of the decrease in the switching frequency.

In the area near the zero cross where the input current is small, by making either the step-up converter 3a or 3b is made to be the used state and the current to be the continuous mode, no operation loss occurs in the step-up converter 3 under the stop state, allowing the circuit loss to be reduced, and at the same time, the ripple of the input current is made small, allowing the harmonics component to be suppressed.

Next, descriptions will be given to operations based on the switching frequency as the predetermined condition for switching the use condition and the current mode.

Like the above Embodiment 4, when the switching frequency is less than the threshold, the opening and closing control means 40 turns both opening and closing means 9a and 9b on and makes both step-up converters 3a and 3b to be used state. The switching control means 7 controls the switching of the switching element 5 so that the current mode flowing through the step-up reactor 4 to be the critical mode or the discontinuous mode.

When the switching frequency is equal to or larger than the threshold, the opening and closing control means 40 turns either opening and closing means 9a or 9b on and the other off and makes either step-up converter 3a or 3b to be used state. The switching control means 7 controls the switching of the switching element 5 so that the current flowing through the step-up reactor 4 to be the continuous mode.

Through such operations, in the area where the switching frequency is low, by making both step-up converters 3a and 3b to be used state and making the current mode to be the critical mode or the discontinuous mode, the current flowing through components of each step-up converter 3 can be suppressed, and at the same time, the current ripple flowing through the step-up reactor 4 can be made large, allowing the switching loss to be reduced because of the decrease in the switching frequency.

In the area where switching frequency is high, by making either step-up converter 3a or 3b to be the used state, and making the current to be the continuous mode, no operation loss occurs in the step-up converter 3 under the stop state, the circuit loss being reduced, the ripple of the input current being made small, allowing the harmonics components to be suppressed.

Next, descriptions will be given to operations based on the output voltage as the predetermined condition for switching the use condition and the current mode.

Like the above Embodiment 4, when the magnitude of the output power detected by the output power detection means 30 is equal to or larger than the threshold, the opening and closing control means 40 turns both opening and closing means 9a and 9b on and makes both step-up converters 3a and 3b to be used state. The switching control means 7 controls the switching of the switching element 5 so that the current mode flowing through the step-up reactor 4 to be the critical mode or the discontinuous mode.

When the magnitude of the detected output power is less than the threshold, the opening and closing control means 40 turns either opening and closing means 9a or 9b on and the other off and makes either step-up converter 3a or 3b to be used state. The switching control means 7 controls the switching of the switching element 5 so that the current mode flowing through the step-up reactor 4 to be the critical mode or the discontinuous mode.

Through such operations, in the case of high load, by making both step-up converters 3a and 3b to be used state, the current flowing through components of each step-up converter 3 can be suppressed, and by making the current to be the critical mode or the discontinuous mode, the switching loss can be reduced because of the decrease in the switching frequency.

In the case of low load, by making either step-up converter 3a or 3b to be the used state, and making the current to be the continuous mode, no operation loss occurs in the step-up converter 3 under the stop state, loss of the circuit being reduced, the ripple of the input current being made small, allowing the harmonics components to be suppressed.

Next, descriptions will be given to operations based on the circuit efficiency as the predetermined condition for switching the use condition and the current mode.

Like the above Embodiment 4, when the circuit efficiency is less than the threshold, the opening and closing control means 40 turns either opening and closing means 9a or 9b on and the other off, and makes either step-up converter 3a or 3b to be used state. The switching control means 7 switches the current flowing through the step-up reactor 4 to the discontinuous mode when it is in the critical mode and vice versa.

Through such operations, in the case where the circuit efficiency decreases, by making either step-up converter 3a or 3b to be used state, no operation loss occurs in the step-up converter 3 under the stop state, and the circuit efficiency can be improved. When the circuit efficiency decreases, the circuit efficiency can be improved by reducing the switching frequency to decrease the switching loss.

Next, descriptions will be given to operations based on the output voltage, the output voltage command, or the changed values of the output voltage command as the predetermined condition for switching the use condition and the current mode.

Like the above Embodiment 4, to the switching control means 7, the output voltage command is input that sets the output voltage of the step-up converter 3. Based on the output voltage command, the switching control means 7 controls the switching element 5 to set the output voltage of the step-up converter 3.

When the output voltage, the output voltage command, or the changed values of the output voltage command are the predetermined value or range where the current ripple becomes large, the opening and closing control means 40 makes both opening and closing means 9a and 9b to be on and makes both step-up converter 3a and 3b in the used state. The switching control means 7 controls the switching of the switching element 5 so that the current flowing through the step-up reactor 4 becomes the continuous mode.

Through such operations, when the current ripple increases because of the change in the output voltage command, the ripple of the input current can be made to be small and harmonics components can be suppressed by making both step-up converters 3a and 3b to be the used state and making the current mode to be the continuous mode.

In the above descriptions, according to the predetermined conditions such as the level of the input current, switching frequency, circuit efficiency, or output power, the use condition and the current mode are switched. However, the current mode may be switched according to the opening closing conditions of the opening and closing means 9a and 9b.

That is, based on the opening closing conditions of the opening and closing means 9a and 9b, the switching control means 7 may be adapted to switch the current flowing through the step-up reactors 4a and 4b into any of the continuous mode, the critical mode, and the discontinuous mode.

For example, when both opening and closing means 9a and 9b are on state and both step-up converters 3a and 3b are in the used state, the current flowing through the step-up reactor 4a and 4b is made to be the critical mode or the discontinuous mode. On the other hand, when either opening and closing means 9a or 9b is on state and the other off state, and either step-up converter 3a or 3b is in the used state, the current flowing through the step-up reactor 4 under the used state is made to be the continuous mode.

Through such operations, when both step-up converters 3a and 3b are in the used state, by making the current to be the critical mode or the discontinuous mode, the switching loss can be reduced. At the same time, since the input current becomes an addition of two current paths by the step-up converters 3a and 3b and operates under the continuous mode; the ripple of the input current can be made small to suppress the harmonics components.

By making either step-up converter 3a or 3b in the used state and making the current to be the continuous mode, no operation loss occurs in the step-up converter 3 under the stop state, and the loss in the circuit can be reduced. Since the step-up converter 3 under the used state operates in the continuous mode, the ripple of the input current can be made stroll and harmonics components can be suppressed.

In Embodiment 5, like the above Embodiment 1, by adjusting the phase difference of the current flowing through the step-up reactors 4a and 4b to be 180 degrees or a random value centering thereround, harmonics components of the input current and noises or vibrations caused by the current ripple can be suppressed.

In Embodiment 5, descriptions are given to the case where the step-up converter 3 includes two systems. However, the present invention is not limited thereto, and a plurality system of the step-up converter 3 may be connected in parallel like Embodiment 3. Through such a configuration, the same effect as the above Embodiment 3 can be obtained.

Embodiment 6

In Embodiment 6, an example of configuration is shown where a motor drive control apparatus is made to be an object load regarding the converter circuit of the above Embodiments 1 to 5.

Figure 12:
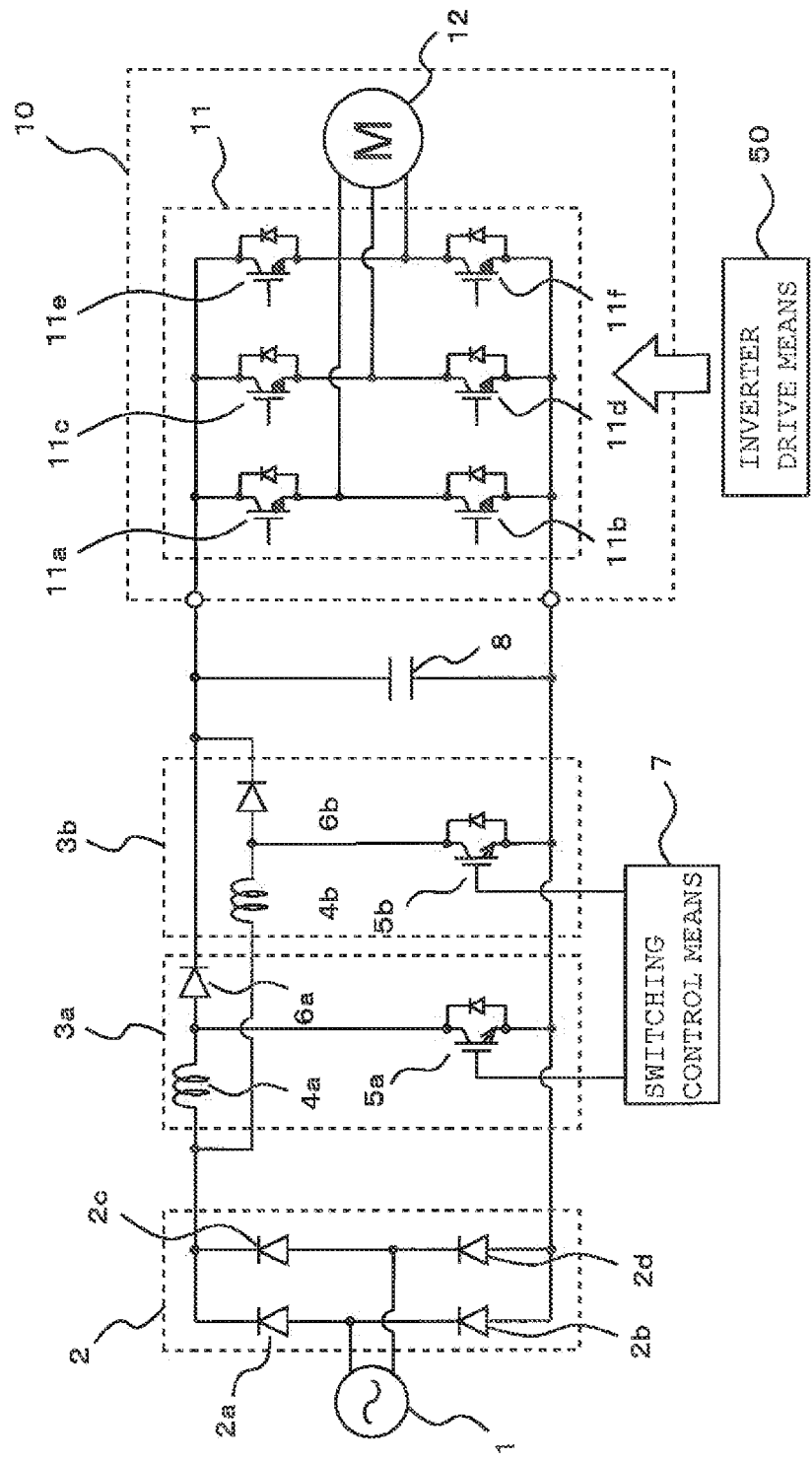
[FIG. 12]

FIG. 12 is a configuration diagram of the motor drive control apparatus according to Embodiment 6 of the present invention.

In FIG. 12, the rectifier 2 that rectifies the AC voltage of the commercial power supply 1 is constituted by four bridge-connected rectifying diodes 2a to 2d. To the output of the rectifier 2, the step-up converters 3a and 3b are connected in parallel.

The step-up converter 3a is constituted by a step-up reactor 4a, a switching element 5a such as an IGBT, and a reverse current prevention element 6a such as a fast recovery diode. The step-up converter 3b is constituted by the step-up reactor 4b, the switching element 5b such as the IGBT, and the reverse current prevention element 6b such as a fast recovery diode, as well.

By switching control means 7, the switching of the switching elements 5a and 5b is controlled and the output of the rectifier 2 is boosted.

An FRD is provided which is connected in inverse-parallel with the switching elements 5a and 5b, respectively. The FRD prevents the switching element 5 from breakdown by the surge that is generated when the switching element 5 turns off.

In the present embodiment, the step-up converter 3 is not limited, but any switching converter may be applied such as a step-up converter, a step-down converter, a step-up/step-down converter.

The output of the step-up converters 3a and 3b is smoothed by the smoothing capacitor 8. A load 10 is connected with the output of the step-up converters 3a and 3b and the smoothed output of the step-up converters 3a and 3b is applied.

The load 10 is constituted by an inverter circuit 11 that converts the output of the step-up converters 3a and 3b into AC voltage and a motor 12 connected with the inverter circuit 11.

The inverter circuit 11 is constituted by bridge-connected switching elements 11a to 11f. In each switching element 11a to 11f, a fast recovery diode is built-in in inverse-parallel. The built-in fast recovery diode functions to flow a free-wheeling current when the switching elements 11a to 11f turn off. The inverter circuit 11 is subjected to PWM control, for example, by the inverter drive means 50 to convert input DC voltage into AC voltage having arbitrary voltages and frequencies to drive the motor 12.

The motor drive control apparatus is constituted by the converter circuit, the inverter circuit 11, and inverter drive means 50.

In FIG. 12, descriptions are given to a case where the load 10 composed of the inverter circuit 11 and the motor 12 is provided with the converter circuit of Embodiment 1. However, the present invention is not limited thereto, but the load 10 composed of the inverter circuit 11 and the motor 12 may be provided with any configuration of the above Embodiments 1 to 5.

It goes without saying that the same effect as the above Embodiments 1 to 5 can be obtained by operating the motor 12 with such a configuration.

Embodiment 7

Figure 13:
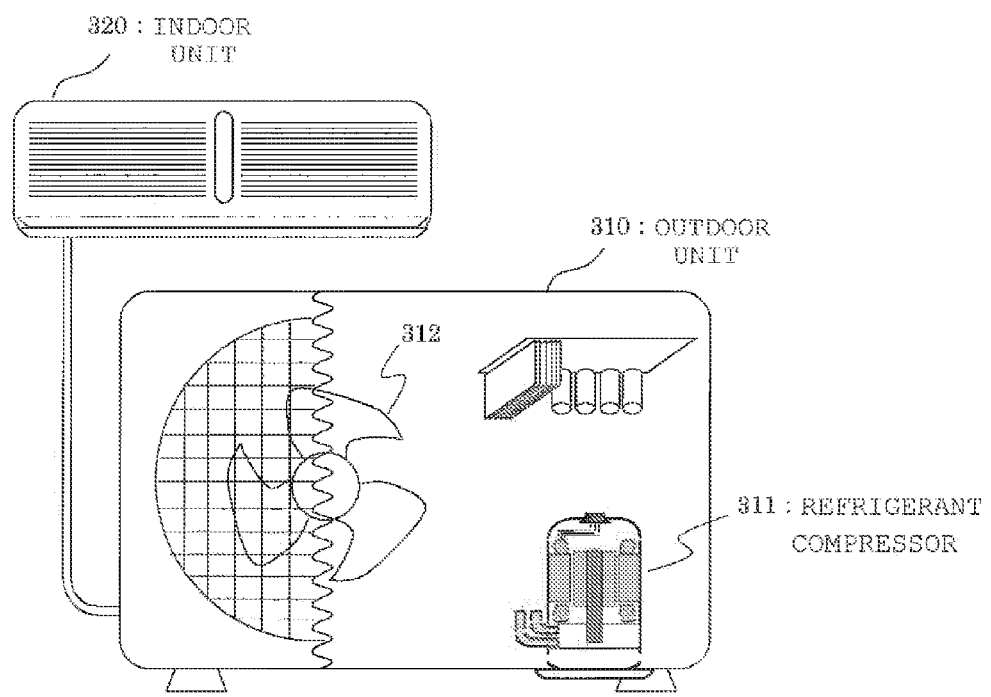
[FIG. 13]

FIG. 13 is a configuration diagram of an air-conditioner according to Embodiment 7 of the present invention.

In FIG. 13, an air-conditioner according to the present embodiment includes an outdoor unit 310 and an indoor unit 320. The outdoor unit 310 includes a refrigerant compressor 311 that is connected with a refrigerant circuit, not shown, and configures a refrigerant cycle and a blower 312 for the outdoor unit that blows in a heat exchanger, not shown. The refrigerant compressor 311 and the blower 312 for the outdoor unit are driven by a motor 12 that is controlled by the motor drive control apparatus according to the above Embodiment 6. It goes without saying that the same effect as the above Embodiments 1 to 6 can be obtained by operating the motor 12 with such a configuration.

Embodiment 8

Figure 14:
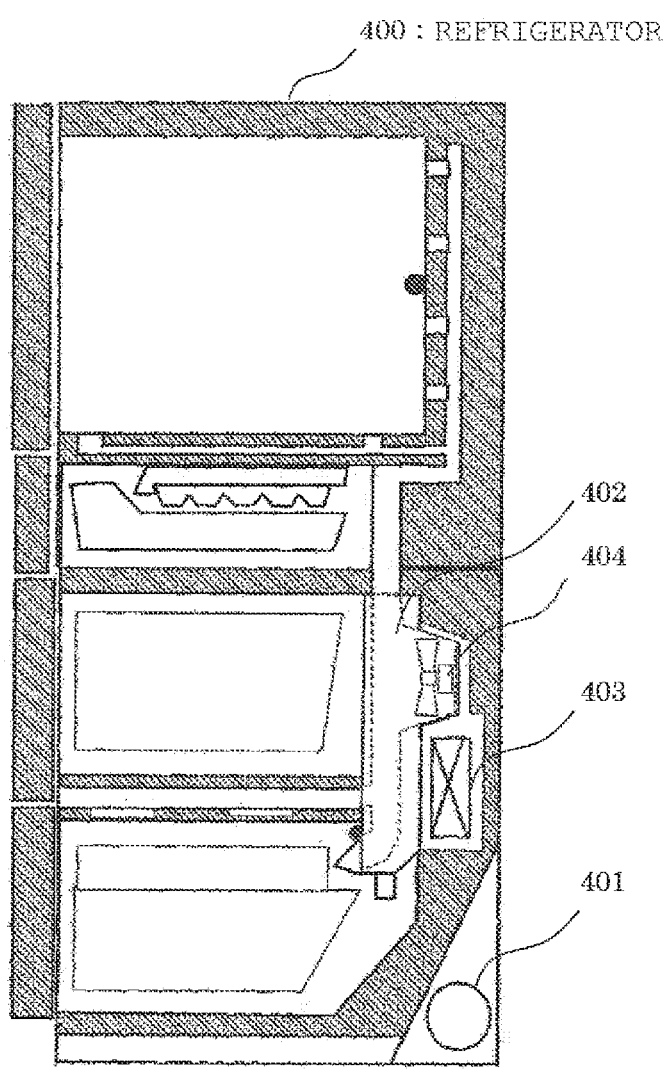
[FIG. 14]

FIG. 14 is a configuration diagram of a refrigerator according to Embodiment 8 of the present invention.

As shown in FIG. 14, a refrigerator 400 includes a refrigerant compressor 401 that configures a refrigeration cycle connected with a refrigeration circuit, not shown, and a cool air circulation blower 404 that that sends cool air generated in a cooler 403 installed in a cooling compartment 402 to refrigerating compartment, freezing compartment, and the like. The refrigerant compressor 401 and the cool air circulation blower 404 are driven by the motor 12 that is controlled by the motor drive control apparatus according to the above Embodiment 6. It goes without saying that the same effect as the above Embodiments 1 to 6 can be obtained by operating the motor 12 with such a configuration.

Embodiment 9

In Embodiment 9, an example of configuration is shown when an induction heating cooker is made to be an object load regarding the converter circuit of the above Embodiments 1 to 5.

Figure 15:
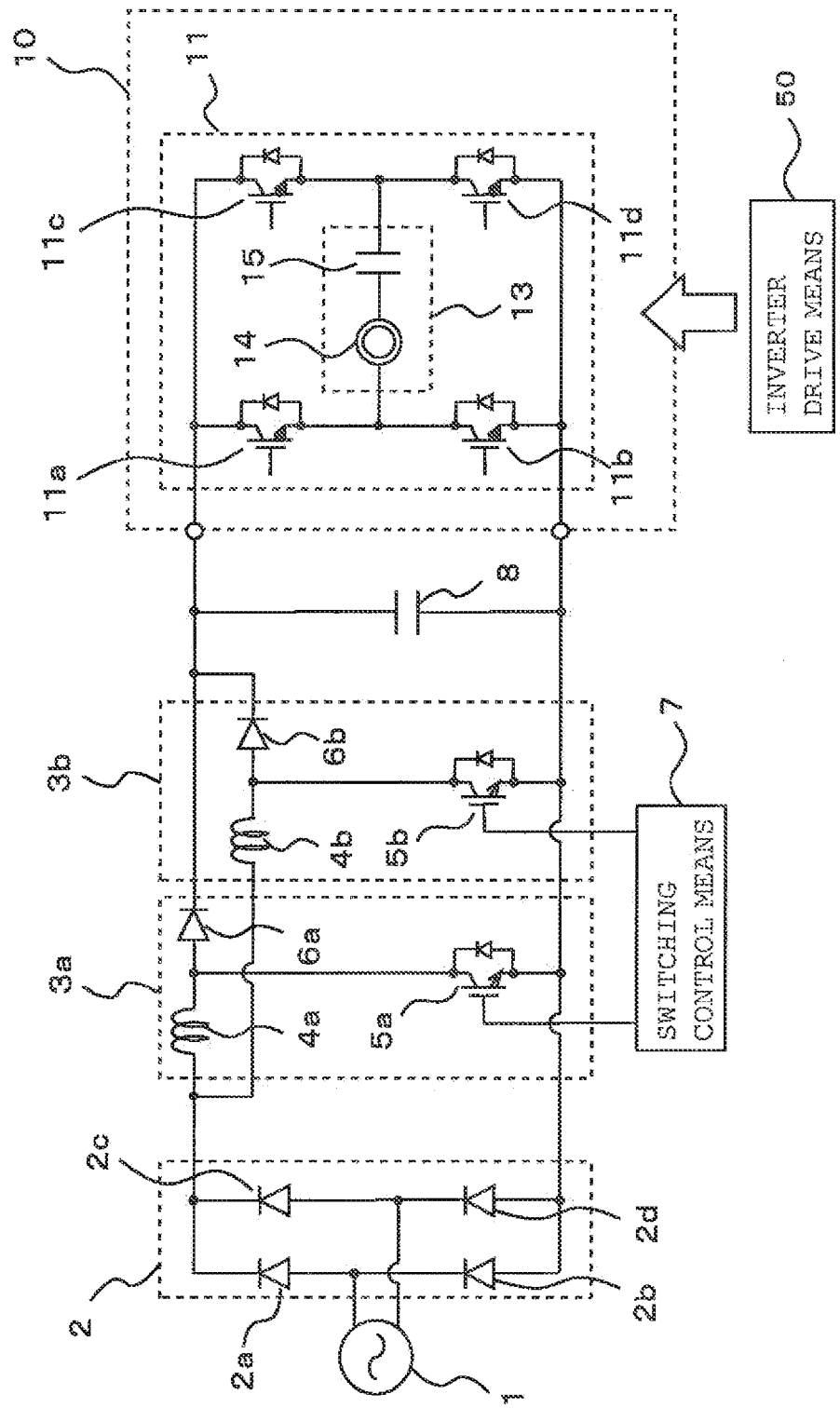
[FIG. 15]

FIG. 15 is a configuration diagram of the induction heating cooker according to Embodiment 9 of the present invention.

In FIG. 15, the rectifier 2 that rectifies the AC voltage of the commercial power supply 1 is constituted by four bridge-connected rectifying diodes 2a to 2d. To the output of the rectifier 2, the step-up converters 3a and 3b are connected in parallel.

The step-up converter 3a is constituted by a step-up reactor 4a, a switching element 5a such as an IGBT, and a reverse current prevention element 6a such as a fast recovery diode. The step-up converter 3b is constituted by the step-up reactor 4b, the switching element 5b such as the IGBT, and the reverse current prevention element 6b such as the fast recovery diode, as well.

By switching control means 7, the switching of the switching elements 5a and 5b is control led and the output of the rectifier 2 is boosted.

An FRD is provided which is connected in inverse-parallel with the switching elements 5a and 5b, respectively. The FRD prevents the switching element 5 from breakdown by the surge that is generated when the switching element 5 turns off.

In the present embodiment, the step-up converter 3 is not limited, but any switching converter may be applied such as a step-up converter, a step-down converter, a step-up/step-down converter.

The output of the step-up converters 3a and 3b is smoothed by the smoothing capacitor 8. A load 10 is connected with the output of the step-up converters 3a and 3b and the smoothed output of the step-up converters 3a and 3b is applied.

The load 10 is constituted by an inverter circuit 11 that converts the output of the step-up converters 3a and 3b into AC voltage and a load circuit 13 connected with the inverter circuit 11.

The inverter circuit 11 is constituted by bridge-connecting switching elements 11a to 11f.

The inverter circuit 11 is driven by the inverter drive means 50 to convert the DC voltage smoothed by the smoothing capacitor 8.

To the output point of the inverter circuit 11, a load circuit 13 composed of an induction heating coil 14 and a resonance capacitor 15 is connected. A high-frequency voltage converted by the inverter circuit 11 is applied to the load circuit 13. Thereby, an object to be heated (not shown) mounted on the induction heating cooker is subjected to induction heating.

In FIG. 15, a case is shown where the load 10 composed of the inverter circuit 11 and the load circuit 13 is provided with the converter circuit of the above Embodiment 1. However, the present invention is not limited thereto, but the load 10 composed of the inverter circuit 11 and the load circuit 13 may be provided with any configuration of the above Embodiments 1 to 5.

It goes without saying that the same effect as the above Embodiments 1 to 5 can be obtained by operating the load circuit 13 by such an induction heating cooker.

For example, as shown in FIG. 12 or 15, when the inverter circuit 11 is connected as the load, since a large-capacity switching element used for the switching converter is usually required, it is difficult to be shared with the switching element used for the inverter circuit.

According to Embodiments 1 to 9, the switching elements can be shared and cost reduction is made possible eventually by selecting the number of the step-up converters which can be configured by the switching elements 5 used in the converter circuit and the switching elements 11a to 11f used in the inverter circuit 11 having the same capacity.

In the above, descriptions are given to embodiments of the present invention. However, the present invention is not limited thereto, but it goes without saying that it is subject to change without being limited by embodiments and without departing from the spirit and scope of the invention such as to employ a three-phase power source instead of the single phase for the commercial power supply 1.

The invention claimed is:

1. A converter circuit, comprising:
a rectifier that rectifies an AC voltage;
a first converter section that is connected with an output of said rectifier and has a first reactor, a first switching element, and a first reverse current prevention element;
a second converter section that is connected with an output of said rectifier, that has a second reactor, a second switching element, and a second reverse current prevention element, and that is connected with said first converter section in parallel;
switching control means that controls said first and second switching elements;
a smoothing capacitor that is provided at an output of said first and second converter sections; and
current detection means that detects an input current input to said first and second converter sections, wherein
said switching control means switches a current mode of a current flowing through said first and second reactors to a critical mode when the input current is equal to or larger than a threshold, and
switches the current mode of the current flowing through said first and second reactors to a discontinuous mode when the input current is less than the threshold.

2. The converter circuit of claim 1, wherein
said switching control means controls switching of said first and second switching elements so as to create a predetermined phase difference between the current flowing through said first and second reactors.

3. The converter circuit of claim 1, wherein
said switching control means controls the switching of said first and second switching elements so that the phase difference of the currents flowing through said first and second reactors randomly varies within a predetermined range.

4. The converter circuit of claim 1, further comprising:
one or two or more converter sections that is connected with the output of said rectifier, that has a reactor, a switching element, and a reverse current prevention element, and that is connected with said first and second converter sections in parallel.

5. A motor drive control apparatus, comprising:
the conversion circuit of claim 1
an inverter circuit that converts a DC output voltage of said converter circuit to an AC voltage; and
inverter drive means that drives said inverter circuit.

6. An air-conditioner, comprising:
the motor drive control apparatus of claim 5; and
a motor that is driven by said motor drive control apparatus.

7. A refrigerator, comprising:
the motor drive control apparatus of claim 5; and
a motor that is driven by said motor drive control apparatus.

8. An induction heating cooker, comprising:
the converter circuit of claim 1
an inverter circuit that converts a DC output voltage of said converter circuit to an AC voltage;
inverter drive means that drives said inverter circuit; and
a load circuit that is connected with an output point of said inverter circuit and has at least an induction heating coil and a resonance capacitor.

9. A converter circuit, comprising:
a rectifier that rectifies an AC voltage;
a first converter section that is connected with an output of said rectifier and has a first reactor, a first switching element, and a first reverse current prevention element;
a second converter section that is connected with an output of said rectifier, that has a second reactor, a second switching element, and a second reverse current prevention element, and that is connected with said first converter section in parallel;
switching control means that controls said first and second switching elements;
a smoothing capacitor that is provided at an output of said first and second converter sections, wherein
said switching control means switches a current mode of a current flowing through said first and second reactors to a critical mode when a switching frequency of said first and second switching elements is less than a threshold, and
switches the current mode of the current flowing through said first and second reactors to a discontinuous mode when the switching frequency of said first and second switching elements is equal to or larger than the threshold.

10. A converter circuit, comprising:
a rectifier that rectifies an AC voltage;
a first converter section that is connected with an output of said rectifier and has a first reactor, a first switching element, and a first reverse current prevention element;
a second converter section that is connected with an output of said rectifier, that has a second reactor, a second switching element, and a second reverse current prevention element, and that is connected with said first converter section in parallel;
switching control means that controls said first and second switching elements;
a smoothing capacitor that is provided at an output of said first and second converter sections, and
output power detection means that detects output power of said first and second converter sections, wherein
said switching control means switches a current mode of a current flowing through said first and second reactors based on said output power.

11. A converter circuit, comprising:
a rectifier that rectifies an AC voltage;
a first converter section that is connected with an output of said rectifier and has a first reactor, a first switching element, and a first reverse current prevention element;
a second converter section that is connected with an output of said rectifier, that has a second reactor, a second switching element, and a second reverse current prevention element, and that is connected with said first converter section in parallel;
switching control means that controls said first and second switching elements;
a smoothing capacitor that is provided at an output of said first and second converter sections, and
current detection means that detects an input current input to said first and second converter sections, and
output power detection means that detects an output power of said first and second converter sections, wherein
said switching control means obtains a circuit efficiency based on said input current and said output power to switch a current mode of a current flowing through said first and second reactors based on said circuit efficiency.

12. A converter circuit, comprising:
a rectifier that rectifies an AC voltage;
a first converter section that is connected with an output of said rectifier and has a first reactor, a first switching element, and a first reverse current prevention element;
a second converter section that is connected with an output of said rectifier, that has a second reactor, a second switching element, and a second reverse current prevention element, and that is connected with said first converter section in parallel;
switching control means that controls said first and second switching elements;
a smoothing capacitor that is provided at an output of said first and second converter sections,
wherein information is input to said switching control means on an output voltage command that sets an output voltage of said first and second converter sections, and
said switching control means switches a current mode of a current flowing through said first and second reactors to a continuous mode when said output voltage, said output voltage command, or a changed value of said output voltage command is a predetermined value or range and the current mode is a critical mode or a discontinuous mode.

* * * * *